US010174742B2

(12) United States Patent
Diedrichs

(10) Patent No.: US 10,174,742 B2
(45) Date of Patent: Jan. 8, 2019

(54) METHOD FOR CONTROLLING A WIND PARK

(71) Applicant: Wobben Properties GmbH, Aurich (DE)

(72) Inventor: Volker Diedrichs, Wardenburg (DE)

(73) Assignee: Wobben Properties GmbH, Aurich (DE)

( * ) Notice: Subject to any disclaimer, the term of this patent is extended or adjusted under 35 U.S.C. 154(b) by 561 days.

(21) Appl. No.: 14/416,014

(22) PCT Filed: Jul. 2, 2013

(86) PCT No.: PCT/EP2013/063974
§ 371 (c)(1),
(2) Date: Jan. 20, 2015

(87) PCT Pub. No.: WO2014/012789
PCT Pub. Date: Jan. 23, 2014

(65) Prior Publication Data
US 2015/0148974 A1 May 28, 2015

(30) Foreign Application Priority Data

Jul. 20, 2012 (DE) .................. 10 2012 212 777

(51) Int. Cl.
*G05D 3/12* (2006.01)
*G05D 5/00* (2006.01)
(Continued)

(52) U.S. Cl.
CPC .......... *F03D 7/048* (2013.01); *F03D 7/0284* (2013.01); *G05B 15/02* (2013.01); *H02J 3/16* (2013.01);
(Continued)

(58) Field of Classification Search
CPC ....... G06F 1/26; H02J 3/16; H02J 3/23; H02J 3/38
See application file for complete search history.

(56) References Cited

U.S. PATENT DOCUMENTS 7,982,325 B2   7/2011  Andersen
8,368,238 B2   2/2013  Yasugi et al.
(Continued)

FOREIGN PATENT DOCUMENTS

CN        101689825 A       3/2010
DE   10 2007 005 165 A1     8/2007
(Continued)

OTHER PUBLICATIONS

Brauner Öve, "Netzanbindung von Windkraftanlagen," *Elektrotechnik and Informationstechnik* 116(7-8):428-432, Jul. 1999.
(Continued)

*Primary Examiner* — Mohammad Ali
*Assistant Examiner* — Md Azad
(74) *Attorney, Agent, or Firm* — Seed IP Law Group LLP

(57) ABSTRACT

The invention relates to a method for controlling a wind park comprising several wind power installations to feed electrical power into an electrical AC grid at a point of common coupling (PCC). The method comprises feeding a 3-phase current at a point of common coupling, identifying a grid voltage on the point of common coupling, comparing the grid voltage that was identified on point of common coupling with at least one predetermined set point value, determining set point values for wind power installations depending on a comparison conducted to meet a stability criterion on point of common coupling, passing the determined set point values to plant control units of the individual wind power installations, and producing electrical current at each of the wind power installations depending on the predeter-
(Continued)

mined set point values to be jointly fed in on point of common coupling.

15 Claims, 11 Drawing Sheets

(51) Int. Cl.

| | | |
|---|---|---|
| G05D 9/00 | (2006.01) | |
| G05D 11/00 | (2006.01) | |
| G05D 17/00 | (2006.01) | |
| F03D 7/04 | (2006.01) | |
| H02J 3/16 | (2006.01) | |
| H02J 3/26 | (2006.01) | |
| H02J 3/38 | (2006.01) | |
| F03D 7/02 | (2006.01) | |
| G05B 15/02 | (2006.01) | |

(52) U.S. Cl.
CPC ............... *H02J 3/26* (2013.01); *H02J 3/386* (2013.01); *Y02E 10/723* (2013.01); *Y02E 10/763* (2013.01); *Y02E 40/34* (2013.01); *Y02E 40/50* (2013.01)

(56) References Cited

U.S. PATENT DOCUMENTS

| | | | |
|---|---|---|---|
| 8,686,742 B2 | 4/2014 | Garcia et al. | |
| 9,350,261 B2 | 5/2016 | Komatsu et al. | |
| 9,382,898 B2 | 7/2016 | Teodorescu et al. | |
| 2003/0057924 A1 | 3/2003 | Shimomura et al. | |
| 2005/0042098 A1* | 2/2005 | Wobben | F03D 7/0272 |
| | | | 416/132 B |
| 2007/0055408 A1 | 3/2007 | Delmerico et al. | |
| 2007/0159737 A1* | 7/2007 | Wobben | F03D 9/003 |
| | | | 361/20 |
| 2007/0177314 A1 | 8/2007 | Weng et al. | |
| 2008/0106099 A1 | 5/2008 | Ichinose et al. | |
| 2010/0094474 A1* | 4/2010 | Larsen | F03D 9/003 |
| | | | 700/287 |
| 2010/0207463 A1 | 8/2010 | Fortmann et al. | |
| 2010/0332042 A1 | 12/2010 | Riesberg et al. | |
| 2011/0153092 A1 | 6/2011 | Engelhardt et al. | |
| 2012/0169059 A1 | 7/2012 | Beekmann et al. | |
| 2012/0203385 A1* | 8/2012 | Kumar | H02J 3/26 |
| | | | 700/287 |
| 2014/0159367 A1* | 6/2014 | Yin | F03D 7/028 |
| | | | 290/44 |

FOREIGN PATENT DOCUMENTS

| | | |
|---|---|---|
| DE | 10 2007 039 697 A1 | 2/2009 |
| DE | 10 2009 030 725 A1 | 12/2010 |
| DE | 10 2009 031 017 A1 | 2/2011 |
| EP | 1 512 869 A1 | 3/2005 |
| EP | 2 267 302 A2 | 12/2010 |
| JP | 5947300 U | 3/1984 |
| JP | 2221165 C2 | 1/2004 |
| JP | 2005160260 A | 6/2005 |
| JP | 2007267586 A | 10/2007 |
| JP | 2010187482 A | 8/2010 |
| JP | 4865861 B2 | 2/2012 |
| WO | 97/45908 A1 | 12/1997 |
| WO | 99/33165 A1 | 7/1999 |
| WO | 01/086143 A1 | 11/2001 |
| WO | 02/044560 A1 | 6/2002 |
| WO | 02/086314 A1 | 10/2002 |
| WO | 02/086315 A1 | 10/2002 |
| WO | 03/030329 A1 | 4/2003 |
| WO | 2009/083448 A2 | 7/2009 |
| WO | 2010069989 A2 | 6/2010 |
| WO | 2011/050807 A2 | 5/2011 |
| WO | 2012039034 A1 | 3/2012 |
| WO | 2012062323 A | 5/2012 |

OTHER PUBLICATIONS

Diedrichs et al., "Loss of (Angle) Stability of Wind Power Plants—The Underestimated Phenomenon in Case of Very Low Short Circuit Ratio," 10th International Workshop on Large-Scale Integration of Wind Power into Power Systems, Transmission Networks for Offshore Wind Farms, Aarhus Denmark, Oct. 25-26, 2011, 8 pages.

Rodríguez-Amenedo et al., "Automatic Generation Control of a Wind Farm with Variable Speed Wind Turbines," *IEEE Transactions on Energy Conversion* 17(2):279-284, Jun. 2002.

Kundur, *Power Systems and Control*, Third Edition, McGraw-Hill, New York, 1994, Chapter 8, "Power System Stability," 12 pages.

* cited by examiner

METHOD FOR CONTROLLING A WIND PARK

BACKGROUND

Technical Field

The present invention relates to a method for controlling a wind park, as well as such a respective wind park. In particular, the present invention relates to controlling a wind park to feed electrical power into an electrical AC grid on a point of common coupling, as well as such a wind park.

Description of the Related Art

Wind parks are generally known, they relate to several wind power installations that belong together in organizational terms. In particular, all wind power installations that belong to a wind park feed into an electrical AC grid on a point of common coupling. Usually, each wind power installation itself generates an electrical current that is to be fed, i.e., usually a 3-phase electrical current that is to be fed in. For this purpose, the wind power installation refers to the voltage in the electrical AC grid that is to be fed in, which is also simply referred to below as grid, in particular according to the amplitude, frequency, and phase of the voltage.

In addition, it is meanwhile known and desirable to use wind power installations, particularly wind parks, to support the grid. In other words, the aim is not only to feed as much energy into the grid as possible, but also to feed it in such a way, and, if necessary, even to reduce the fed-in power, that the grid can be supported in electrical terms. First patent applications that have dealt with such topics are WO 02/086315, WO 02/086314, WO 01/86143, WO 99/33165, and WO 02/044560. A method is known from WO 03/030329 A1 according to which all of the output power of the wind park can be reduced externally by the operator of the connected electrical supply grid.

Furthermore, reference is made to the essay "Loss of (Angle) Stability of Wind Power Plants" by V. Diedrichs et al., submitted for and presented at the "10th International Workshop on Large-Scale Integration of Wind Power into Power Systems as well as on Transmission Networks for Offshore Wind Farms, Aarhus (Denmark), 25-26 Oct. 2011". There, reference was basically made to the problem that the loss of stability in the grid can basically also occur for wind power installations that are connected to the supply grid for feed-in.

Here, the operator can predetermine a percentage value by which the respective wind power installations can reduce their power.

Such approaches are partly already provided to stabilize the grid. In particular, these solutions consider an adjustment of the fed-in power to the current demand; in particularly, they are to consider an oversupply or undersupply of power in the grid.

When feeding in electrical power, i.e., both active power as well as reactive power, it is an overall need to secure the stability of power systems and power plants, including wind power installations and wind parks. Here, stability relates to frequency and voltage simultaneously in all areas of the power system.

The loss of such a stability is generally also referred to as "loss of stability", and can be abbreviated as LOS. "Loss of stability" describes physical processes and conditions, which no longer secure said stability, and illustrates that these are to be avoided or stopped as soon as possible, if they already exist. These problems are basically rare, but they are therefore all the more serious. For example, this includes a generally known shut-off of portions of the grid, as occurred, for example, in 2004 in the US, or of the overall power system, as occurred in 2004 in Italy.

Basically, technical knowledge with regard to the topic of stability has been developed in depth and dealt with in a wide variety of publications. An internationally recognized standard work is Kundur, P.: Power Systems Stability and Control, McGraw-Hill.

The so-called "short circuit ratio" (SCR) serves to assess the operability of power plants on a global scale, mostly with synchronous generators, on point of common couplings with power systems.

Besides such a global or absolute assessment by means of the SCR, further assessments are conducted according to special criteria. Such criteria aim at different types of processes that are relevant to stability, such as the process of a voltage collapse, or at the stability of an angle, i.e., phase angles in the grid, which is generally referred to as "angle stability". These assessments particularly provide metrics or standards for stability distances.

This short circuit current ratio is the ratio of the short circuit power to the connected load. Here, short circuit power is the power that the respective supply grid on the considered point of common coupling, to which the relevant power plant is to be connected, can provide in the case of a short circuit. The connected load is the connected load of the power plant that is to be connected, in particular the nominal capacity of the generator that is to be connected.

With regard to the requirements of a short circuit current ratio, SCR, a short circuit current ratio of SCR>4, however, practically often SCR>10, has been considered necessary for the reliable operation of power plants with synchronous generators. For this purpose, for Germany, reference is made to the VDN Transmission Code 2007. A short circuit current ratio of SCR>4 . . . 6 is usually required on the market for the connection of wind power installations or wind parks.

The accordingly required amount of the SCR limits the power of the power plant on a given "point of common coupling" (PCC), as it is generally referred to, or it determines required grid reinforcements.

The short circuit power is a grid characteristic on the respective point of common coupling, and thus at first a predetermined value, if the respective grid already exists there. As the short circuit current ratio should not fall short of a certain value, i.e., particularly in the area of 4 to 6, the power of a power plant or a wind park that is to be connected to a point of common coupling is limited. Therefore, power plants can only be connected up to a certain value, or it becomes necessary to expand the grid in order to facilitate the connection of a power plant with higher output.

The German Trademark and Patent Office has investigated the following state-of-the-art in the priority application: DE 10 2009 030 725 A2, WO 2011/050807 A2 and Loss of (Angle) Stability of Wind Power Plants—The Underestimated Phenomenon in Case of Very Low Short Circuit Ratio in 10th International Workshop on Large-Scale Integration of Wind Power into Power Systems as well as on Transmission Networks for Offshore Wind Farms, Aarhus, 26. Oct. 2011 by Volker Diedrichs, Alfred Beekmann, Stephan Adloff.

BRIEF SUMMARY

One or more embodiments of the present invention may address at least one of the problems mentioned above. In one embodiment there is provided a wind power installation or a wind park connected to a point of common coupling and operated in a stable manner, with a short circuit current ratio that is as low as possible, particularly with a short circuit current ratio of SCR>1.5 . . . 2. In particular, this is to be achieved for a wind power installation or a wind park with a power feed-in by means of full power converters, i.e., so-called voltage-controlled inverters, which are also referred to as "voltage source converters" (VSC). An alternative solution should at least be proposed.

According to one embodiment of the invention, a method for controlling a wind park comprising one or several wind power installations that feed electrical power into an electrical AC grid on a joint point of common coupling (PCC). The method for controlling the wind park can thus also be considered or referred to as a method for feeding in electrical power by means of a wind park. Here, a 3-phase current is first fed in on the point of common coupling.

Furthermore, a grid voltage is identified on the point of common coupling. The identification is particularly performed by measurement, whereby the values of the determined grid voltage that are actually further used can be further processed, particularly by arithmetical processing.

The identified grid voltage is then compared with at least one given set point value. The method relates to the stable feed of electrical power into an electrical AC grid, which is simply referred to below as the grid. Accordingly, the expert knows that the comparison is to be performed as quickly as possible in real-time, and as often as possible, preferably continuously or almost continuously. In addition, a common AC grid is basically assumed, which has a grid frequency of 50 Hz or 60 Hz. Accordingly, the identification of the grid voltage is to be performed quickly and frequently on the point of common coupling.

Furthermore, at least one set point value is determined for each wind power installation. This set point value is determined depending on the performed comparison, i.e., the identified grid voltage with a set point value for the voltage. The respective set point value is determined in such a way that a stability criterion can be implemented on the point of common coupling. Accordingly, this set point value is also determined on an ongoing basis, and set depending on the comparison, which is also performed on an ongoing basis, and thus is updated according to a changing situation. Therefore, the set point value can constantly change, and thus, there are several temporally subsequent set point values. Accordingly, the method also relates to the determination of set point values. These set point values can be identical (only initially, as the case may be) for several wind power installations in the park, or they can be adjusted individually for each wind power installation. Such an individual adjustment depends not least of all on the type of set point value, as well as on whether or not the respective wind power installations are equal. The assignment of the set point value can also depend on the local arrangement of the respective wind power installations in the park, i.e., particularly if electrical connection lines from the respective wind power installation to the joint point of common coupling are significantly different from the electrical connection between the respective wind power installation and the point of common coupling.

The set point values are transferred to plant control units of the individual wind power installations. Therefore, it is provided that each wind power installation has its own control unit, and that set point values are transferred to said control unit. Therefore, the wind power installation or its individual plant control unit receives at least one set point value or a sequence of set point values from a central Location; however, it individually adjusts the specific control in the wind power installation. In particular, the 3-phase current that is to be fed in, i.e., the individual phase currents that are to be fed in according to the amount, phase and frequency, is specifically produced by each plant control unit of each wind power installation individually.

The electrical currents produced for the feeding of each wind power installation are then jointly transferred to and fed into the point of common coupling of the wind park. In particular, for this purpose, the currents are linearly superimposed with other currents of other wind power installations. For this purpose, each wind power installation can comprise an output inductor and/or an output transformer.

Basically, the reasons for determining a short-circuit current ratio of SCR>4, or even SCR>6, are justified. With low short circuit current ratios, strong increases or falls (in particular, exponential increases or falls of the current sensitivities on the joint point of common coupling [PCC]) are to be expected, i.e., depending on the respectively fed in reactive and active power or as a response to this. Here, the internal controls in the wind power installations can become instable if the voltage on the point of common coupling is used as an actual value for these controls. Furthermore, voltage controls can become instable. Similarly, there is the threat of a loss of stability on the basis of the mechanisms of a voltage collapse and/or on the basis of an angle stability or a loss of such an angle stability.

The proposed solution is particularly intended to prevent internal controls of wind power installations from becoming instable when using the voltage on the joint point of coupling as an actual value.

Similarly, it is to be prevented voltage controls from becoming instable, which use the reactive power of the wind power installation or of the wind park as a manipulated variable.

Finally, it is also to be prevented that the system, i.e., particularly the feeding wind park, come too close to a stability boundary or a so-called LOS (loss of stability) boundary.

Preferably, it is proposed that the current that is fed in on the point of common coupling also be identified, and particularly measured there, or that the fed-in current be identified on the basis of a measurement directly on or directly behind the point of common coupling. This leads to the control being based on the currents, which are actually fed in. Possible deviations between the set current or set currents and the current, which is actually fed in are thus taken into consideration. Similarly, the power, which is actually fed in, particularly the fed-in active power, can be identified if the respective currents and voltage are known according to the amount and phase. During the measurement on the grid, the response of the grid is also identified and considered. This response of the grid reacts to the actually fed-in power, i.e., the actually fed-in currents, and in this respect, the measurements allow for the grid's responses being assigned to the actually fed-in electrical variables.

In addition or alternatively, identifying the fed-in current, identifying the grid voltage on the point of common coupling, comparing the grid voltage measured on the point of common coupling with at least one predetermined set point value and/or determining the set point value is done by a central control unit. Therefore, a unit for several wind power installations, particularly for all wind power installations of the park, is provided which identifies, measures and/or calculates said sensitive data. This also serves to prevent that the individual wind power installations or their controls can work against each other, because such a central control unit can also predetermine a set point value that is stable over time. A minor control fluctuation is therefore not immediately noticeable and/or cannot or is very unlikely to result in a chain reaction for the other wind power installations connected to the same point of common coupling. In particular, such effects are avoided whereby, for example, a first wind power installation leads to a voltage change on the point of common coupling, and a second wind power installation based on this detected voltage change, for example, counteracts in terms of control, which in turn can lead to an effect, such as a voltage change, which in turn causes the first wind power installation to counteract, which could initiate a chain reaction.

The plant control units of the individual wind power installations, which receive their set point values particularly here from the central control unit, individually control the wind power installation and particularly the production of the electrical 3-phase current that is to be fed in respectively. Thus, this production is adapted to the specific wind power installation, and this plant control unit is accordingly controlled individually. With regard to referencing, i.e., particularly identifying a frequency and phase, each plant control unit of each wind power installation can measure individually, and consider individually the centrally recorded measuring values or entry values on the point of common coupling. However, said direct consideration of measuring values in the individual plant control units is limited particularly to said referencing. In particular, the amount of the active power and reactive power that is to be fed in is not determined by each individual plant control unit, but is predetermined by said central control unit.

In simple terms, the central control unit is a calming influence, and provides the possibility of specifying important set point values that are relevant to stability jointly and individually, whereas individual plant control units are functionally adapted to each individual wind power installation so as to particularly predetermine the specific currents that are to be fed in.

The individual and functional adaption of the individual plant control units can preferably act upon the operational control of the wind power installation, and, for example, control a reduction of the power produced by the wind by adjusting the rotor blades of the wind power installation. Adjusting the rotor blades is generally known as blade pitch and is performed individually by the wind power installation, particularly by its plant control unit. However, it is particularly the central control unit, which predetermines and triggers the implementation of such a reduction.

Said division between a central control unit and individual plant control units with the described tasks or the described task distribution, can particularly prevent an internal control of a wind power installation from becoming instable when the voltage of the point of common coupling is used as an actual value, if it is not only used for referencing. Similarly, voltage controls, which use the reactive power of the wind power installation or of the wind park as a manipulated variable, are to be prevented from becoming instable.

In addition or alternatively, the set point values are determined depending on at least one variable stability criterion, whereby the stability criterion particularly depends on a grid condition of the AC grid on the point of common coupling. For example, the stability criterion can depend on the amplitude of the grid voltage, or on a change or a change speed of the amplitude of the grid voltage, or on the frequency or the change in frequency of the grid voltage. The stability criterion as such can be a deviation of the actual voltage from the set point voltage, and depends itself on the voltage.

To name a simple and illustrative example, the stability criterion could be a maximum permissible voltage deviation of, for example, 10% over-voltage, if the voltage frequency corresponds exactly to the set point value. If the frequency, however, is at least slightly higher than the set point frequency, or if the frequency rises in the grid, the mentioned permissible over-voltage could be reduced from 10% to 5%. Therefore, in this example, the stability criterion would be examined on the basis of the voltage, i.e., by examining the voltage level, and at the same time adjusted depending on the frequency, that is, in the illustrative example, it would vary between 5% and 10% over-voltage.

Here, it is possible to consider the voltage on the point of common coupling on the grid side or park side. Voltages on the terminals of the wind power installations can also be considered.

Depending on this stability criterion, at least one set point value is changed for the wind power installations. In particular, a set point value can be changed respectively for the reactive power, the active power or both.

Alternatively, the reactive power and/or the active power that is fed in by the wind park can also be taken as a basis for the stability criterion. In this case, the stability criterion can particularly be an existing specification in the form of a value or an area for the active power or the reactive power that is to be fed in, along with compliance with the provision that this specification be examined. The fed-in active power can only be influenced to a certain extent, as the active power that can be fed in depends on the prevailing wind. With a proposed stability criterion, the active power and reactive power ratio can be relevant. For example, a certain adaption of the reactive power to the active power can be relevant and taken as a basis.

Preferably, determining the set point value is based on a breakdown of the positive sequence component and the negative sequence component according to the method of the symmetrical component, and the set point values are values of the positive sequence component, i.e., at least one reactive power of the respective wind power installation that is to be fed in and related to the positive sequence component, and in addition or alternatively at least one output or clamp voltage of the respective wind power installation that is related to the positive sequence component, and in addition or alternatively at least one active power of the respective wind power installation that is to be fed in and related to the positive sequence component, particularly a maximum active power that is to be fed.

By predetermining the reactive power and/or active power that is to be fed in, an important value can be predetermined that supports the grid or influences the grid stability. A respective reactive power can help to resolve or reduce a voltage fall in a long supply line or long line in the AC grid.

A threatening instability due to a very low short circuit current ratio, i.e., due to a comparably large connected load, can be solved by reducing the fed-in active power. Predetermining a maximum active power that is to be fed in is particularly provided because the prevailing wind permanently limits the active power that is to be fed in, and thus a specific active power set point value that exceeds such a limit cannot be implemented.

A combined and coordinated specification of the active power and the reactive power that is to be fed in is also advantageous, because an operating point that is determined according to the active power and the reactive power is particularly crucial for the wind park's stability during the feeding.

By taking the method of the symmetrical components as a basis, an asymmetrical 3-phase system can also be considered. Ideally, the components of the negative sequence component are set to 0, i.e., if the 3-phase system is symmetrical.

According to one embodiment, it is proposed that a stability boundary be calculated and stored for the control, particularly that it be stored in the central control unit as a characteristic map. For example, such a stability boundary can be a characteristic map or, graphically shown, a characteristic, which is formed by several reactive power and active power value pairs. Accordingly, the set point values for reactive power and active power are determined respectively in such a way that an operating point that is defined according to the reactive power and the active power is located only on one side of said stability boundary, i.e., on the stable side.

Such a stability boundary is particularly a characteristic of the connected grid with regard to the grid feed point. Accordingly, it is preferably proposed to measure or otherwise identify the connected AC grid in order to determine such a stability boundary. When such a stability boundary is determined and stored, a stable operating point can accordingly be easily and/or reliably set or monitored. The control of the wind park, i.e., the feeding in on the point of common coupling, is then not required, or at least less required to detect a threatening loss of stability due to suddenly detected dynamic processes, particularly on the point of common coupling. Rather, it can be recognized at an early stage at which (and, as the case may be, also when) a loss of stability would occur if no countermeasures were taken. Thereby, possible abrupt countermeasures or radical countermeasures can be avoided if an operating point is set safely. Preferably, such an operating point can be defined by the fed-in active power and the fed-in reactive power, and preferably the active power and the reactive power that is to be fed in is accordingly limited and/or an operating point is set accordingly. Preferably, such an operating point is set or limited in such a way that a safety distance between the operating point and the stability boundary is set and maintained.

According to another embodiment, it is proposed that parameters of the grid feed-in point or parameters of the AC grid according to measurements on the grid feed-in point be compared with regard to the grid feed-in point so as to assess characteristics of the AC grid. In particular, the voltage identified on the grid feed-in point and/or the current identified on the grid feed-in point are used. Hereby, a parameter can be a sensitivity of the grid to feed-in values. Such a sensitivity is a change in voltage on the point of common coupling with regard to a change in the fed-in power. In particular, it can be calculated from the sum of the change in voltage depending on the change in the fed-in active power and the change in voltage depending on the change in the fed-in reactive power. In other words, the sensitivity is calculated here from a partial derivative of the voltage according to the active power on the one hand and the reactive power on the other. Said sensitivity, which is also referred to as grid sensitivity, and which relates to the point of common coupling, possibly also serves to detect a threatening loss of stability, or at least a weakening of the grid stability. In addition or alternatively, it is proposed to use this for an assessment of the quality, and, particularly, of the stability of the operating point of the wind park or the operating point of the wind power installation. On this basis, it is possible, if required, to take corrective action.

Preferably, it is proposed that grid sensitivities be recorded and stored during a previously conducted grid analysis, and that in addition, grid sensitivities to a current operating point be identified. A control, specification and/or change of at least one set point value is then realized depending on a comparison of the current grid sensitivities with the previously recorded grid sensitivities. In particular, a set point value for the active power that is to be fed in is reduced if the comparison reveals that a deviation exceeds a predetermined threshold value. The grid sensitivities are the grid's responses to changes, particularly changes in the feeding. Here, particularly a consideration of a grid sensitivity is considered as a response to a change in the fed-in active power, and a grid sensitivity is considered as a response to a change in the fed-in reactive power. Said two grid sensitivities can also be combined or considered together. Such a grid sensitivity is a grid characteristic and can therefore be previously recorded and stored. It can help to detect instabilities at an early stage and to avoid them. In particular, a high grid sensitivity means that the grid is very strong, i.e., that it is very sensitive and already responds to small changes. The control can be adjusted accordingly, as proposed according to one embodiment.

In addition, it must be noted that conditions can also change in the grid, and boundary conditions can have an impact on the grid sensitivity. By comparing the currently collected grid sensitivities with the respective previously determined grid sensitivities, it is possible to detect whether the grid is still behaving in the manner previously determined or if a divergent behavior is to be expected. In the latter case, special care may be needed, as the control specifications might no longer be sufficient, or at least no longer optimally adapted to the grid. For this case, reducing the fed-in active power can be the first protective measure. In particular, this can help to increase a distance between the operating point to the stability boundary.

According to another embodiment, a sudden change or a change in one or two steps of a set point value for the reactive power that is to be fed in and/or for the active power that is to be fed in is proposed. This results in a major change with an accordingly strong impact. In addition, a gradual change can also lead to the fact that a change is required in fewer cases, particularly that the active power and/or the reactive power that is to be fed in is not required to be continuously changed. Preferably, such a sudden or gradual change is made with a predetermined delay.

According to one embodiment, it is also proposed, based on a response of the grid's voltage on the point of common coupling to such a sudden change, to determine a current grid sensitivity. Here, the grid sensitivity can be achieved by generating a difference, i.e., by identifying the voltage as well as the suddenly changed active power or reactive power at a time prior to the sudden change, and at a time after the sudden change, and by putting said two differences in relation to each other.

According to one embodiment, it is additionally proposed that an hysteresis controller be used to predetermine the set point values. An hysteresis controller is a controller the output of which, i.e., the manipulated variable (such as, in this case, the specification of the set point values) is not directly and clearly related to a respective input value, but also depends on previous values. If a voltage forms the input of the controller, which in this case is used merely as a general example, and a reactive power forms the output of the controller, an increase of the voltage beyond its set point value can, for example, lead to an increase of the reactive power. If the voltage returns to its set point value, or at least to the area, the reactive power can then, at least temporarily, maintain its value. Similarly, a proposed hysteresis controller can include a delay so that, using the same illustrative example, a voltage excess does not immediately lead to a response of the controller, but only after a certain time lapse. However, if a voltage excess no longer exists prior to this time lapse, there is no response at the controller's output. In particular, an hysteresis controller is also a non-linear controller. As a purely precautionary measure, it is pointed out that a controller, the transmission behavior of which is amplitude-dependent, is a non-linear controller.

In addition or alternatively, it is proposed that the method for controlling a wind park be characterized in that a change of at least one of the set point values is made if a state variable in the grid fulfills a specific criterion, and if a predetermined downtime has elapsed and the predetermined criterion remains fulfilled. This particularly concerns the grid voltage on the point of common coupling, and here, the fulfillment of the predetermined criterion can exceed or fall short of the predetermined threshold value or of another predetermined threshold value or exceed the value of it. Another criterion that can be considered is that the relevant value, particularly the grid voltage, is outside the tolerance band.

Preferably, it is proposed that when specifying the set point values, the impedance of at least one supply line from a wind power installation to the point of common coupling be taken into consideration if a voltage drop that is to be expected on the supply line is to be considered. Here, particularly an impedance of a line to the point of common coupling can be considered, even if it is located far away from the wind park. Particularly in said case, said impedance from the wind power installation to the point of common coupling can be similar for many wind power installations in the park, and simply be taken as identical. The set point values of the wind power installation, i.e., particularly for the reactive power and active power that is to be fed in, and thus for the currents that are to be fed in, are preferably based on a virtual voltage on the wind power installation. Preferably, an output voltage as a virtual voltage is taken as a basis here, which, due to a voltage drop, is caused by or to be expected because of the effective impedance from the supply line to the point of common coupling.

The load flow calculation described below is used to analyze stationary operating conditions of energy supply systems. The underlying basis is the representation (FIG. 9) of the respective grid through its impedances Z or its admittances Y (complex conductances).

The classical grid analysis determines the grid via Ohm's law with the following linear equation system in matrix notation, which describes a correlation for n-knots.

$$\begin{bmatrix} \underline{Y}_{11} & \cdots & \underline{Y}_{12} & \underline{Y}_{1i} & \cdots & \underline{Y}_{1n} \\ \underline{Y}_{21} & \cdots & \underline{Y}_{22} & \underline{Y}_{2i} & \cdots & \underline{Y}_{2n} \\ \vdots & & \vdots & \vdots & & \vdots \\ \underline{Y}_{n1} & \cdots & \underline{Y}_{n2} & \underline{Y}_{ni} & \cdots & \underline{Y}_{nn} \end{bmatrix} \begin{bmatrix} \underline{V}_1 \\ \underline{V}_2 \\ \vdots \\ \underline{V}_n \end{bmatrix} = \begin{bmatrix} \underline{I}_1 \\ \underline{I}_2 \\ \vdots \\ \underline{I}_n \end{bmatrix}$$

i.e.: $\underline{Y} \cdot \underline{V} = \underline{I}$ (linear equation system).

The aim is to determine voltages on each of the n-grid knots (→voltage maintenance).

As the currents in the grids are unknown but the (planned) feed-ins and electrical falls are known, the currents are expressed as outputs.

$$\underline{I}_{ii} = \frac{\underline{S}_i^*}{\underline{V}_i^*} = \frac{P_i - jQ_i}{\underline{V}_i^*}$$

Representing the grid equations via outputs results in the formation of a non-linear equation system.

$$\underline{S}_i^* = P_i - jQ_i = \underline{Y}_{i1}\underline{V}_1\underline{V}_i^* + \underline{Y}_{i2}\underline{V}_2\underline{V}_i^* \ldots = \underline{V}_i^* \sum_{k=1}^{n} \underline{Y}_{ik}\underline{V}_k$$

This non-linear equation system is solved numerically (usually by Newton's method). When solving the equation system numerically, it must be linearized. This is done by the partial derivations of the matrix elements on the basis of the unknown, namely still the amplitude ($V_2 \ldots V_n$ and the angle ($\delta_2 \ldots \delta_n$) of the knot voltages here.

The matrix with the partial derivations is called a Jacobian matrix. In order to solve the equation system, this must be invertible, i.e., regular.

$$\begin{bmatrix} \Delta P_2^{(0)} \\ \vdots \\ \Delta P_n^{(0)} \\ \Delta Q_2^{(0)} \\ \vdots \\ \Delta Q_n^{(0)} \end{bmatrix} = \begin{bmatrix} \left(\frac{\partial P_2}{\partial \delta_2}\right)^{(0)} & \cdots & \left(\frac{\partial P_2}{\partial \delta_n}\right)^{(0)} & \left(\frac{\partial P_2}{\partial V_2}\right)^{(0)} & \cdots & \left(\frac{\partial P_2}{\partial V_n}\right)^{(0)} \\ \vdots & & \vdots & \vdots & & \vdots \\ \left(\frac{\partial P_n}{\partial \delta_2}\right)^{(0)} & \cdots & \left(\frac{\partial P_n}{\partial \delta_n}\right)^{(0)} & \left(\frac{\partial P_n}{\partial V_2}\right)^{(0)} & \cdots & \left(\frac{\partial P_n}{\partial V_n}\right)^{(0)} \\ \hline \left(\frac{\partial Q_2}{\partial \delta_2}\right)^{(0)} & \cdots & \left(\frac{\partial Q_2}{\partial \delta_n}\right)^{(0)} & \left(\frac{\partial Q_2}{\partial V_2}\right)^{(0)} & \cdots & \left(\frac{\partial Q_2}{\partial V_n}\right)^{(0)} \\ \vdots & & \vdots & \vdots & & \vdots \\ \left(\frac{\partial Q_n}{\partial \delta_2}\right)^{(0)} & \cdots & \left(\frac{\partial Q_n}{\partial \delta_n}\right)^{(0)} & \left(\frac{\partial Q_n}{\partial V_2}\right)^{(0)} & \cdots & \left(\frac{\partial Q_n}{\partial V_n}\right)^{(0)} \end{bmatrix} \begin{bmatrix} \Delta \delta_2^{(0)} \\ \vdots \\ \Delta \delta_n^{(0)} \\ \Delta V_2^{(0)} \\ \vdots \\ \Delta V_n^{(0)} \end{bmatrix}$$

Jacobian matrix

BRIEF DESCRIPTION OF THE SEVERAL VIEWS OF THE DRAWINGS

The invention is described in more detail below by embodiments as examples with reference to the accompanying figures.

DETAILED DESCRIPTION

Below, identical reference signs for similar, but non-identical elements may be provided, or they can also be provided for elements that are only illustrated schematically or symbolically, and that may have different details, but which are not relevant for the respective explanation.

Figure 1:
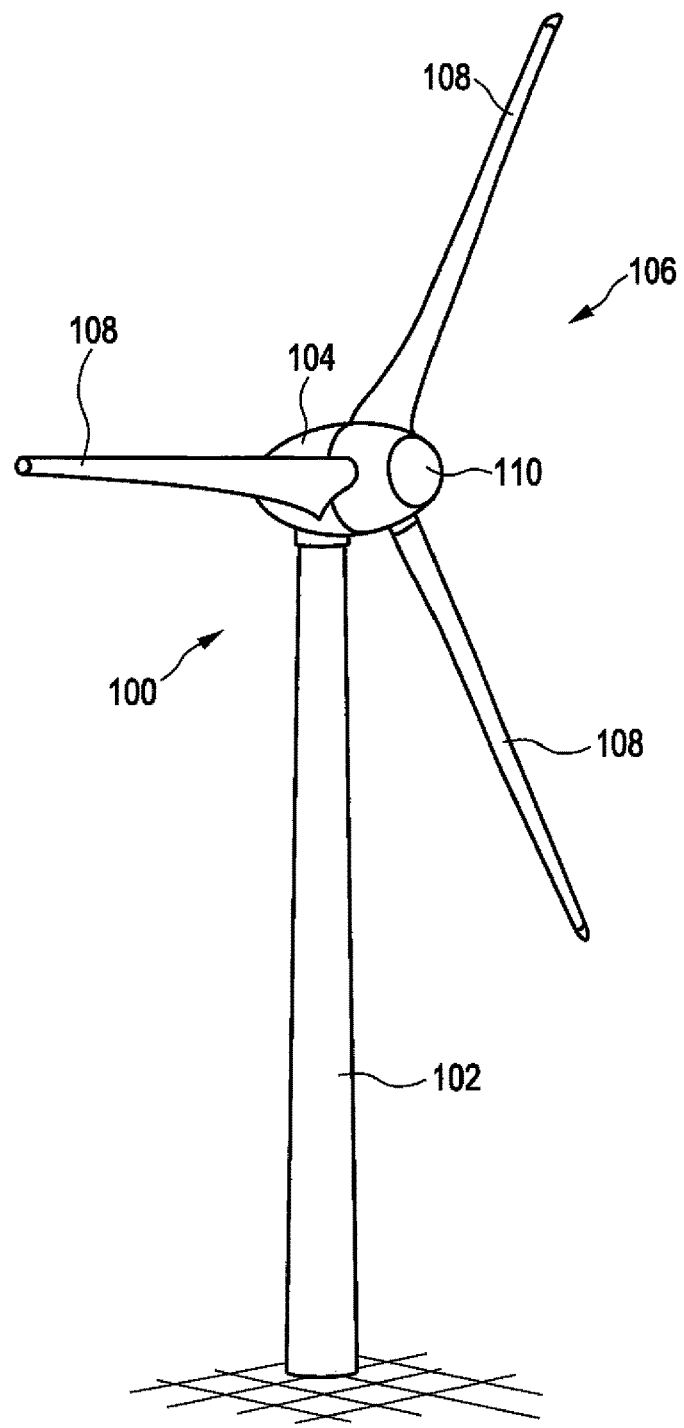
FIG. 1 shows a wind power installation in a perspective view.

FIG. 1 Shows wind power installation 100 with tower 102 and nacelle 104. Rotor 106 with three rotor blades 108 and spinner 110 is located on nacelle 104. Rotor 106 is set in operation by the wind in a rotating movement, thereby driving a generator in nacelle 104.

Figure 2:
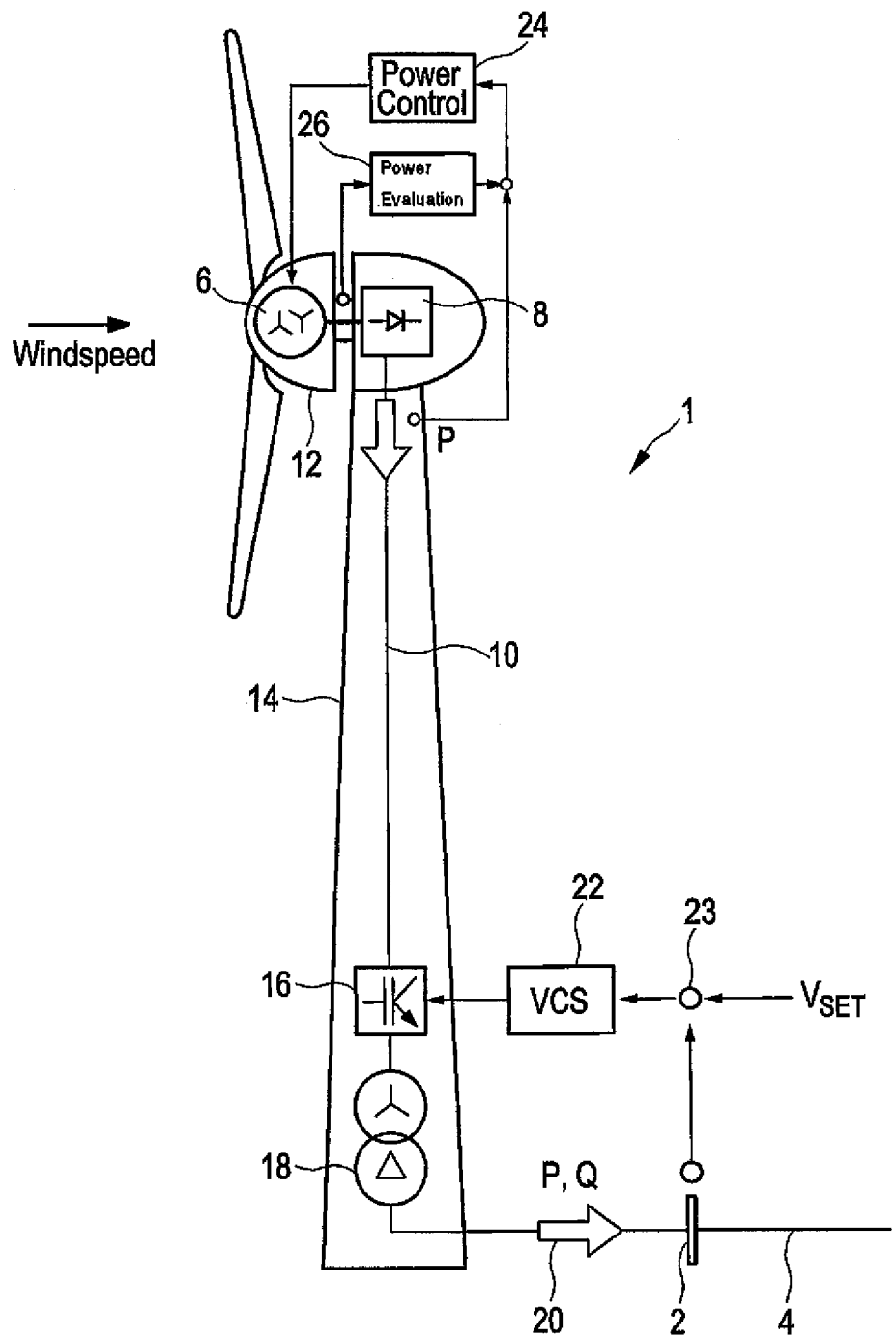
FIG. 2 shows a schematic view of a wind power installation that is connected to a grid, based on a voltage control system (VCS).

FIG. 2 shows a schematic view of a wind power installation 1 connected to electrical supply grid 4 over grid connection point 2. Electrical supply grid 4 is simply referred to as grid 4 or network 4, whereby these terms are used synonymously.

Wind power installation 1 comprises generator 6, which is driven by the wind, thereby producing electrical energy. One of the embodiments of generator 6 is an electrically excited multiphase synchronous generator 6 with 2 respectively star-shaped wired 3-phase systems, which is illustrated by means of the two star symbols in generator 6 of FIG. 2. The generated alternating current, namely the 6-phase alternating current in the mentioned example, is rectified by rectifier 8, and transmitted as direct current via respective DC current line 10, which can comprise several individual lines, from nacelle 12 down tower 14 to inverter 16. Inverter 16 produces alternating current from the direct current, namely in the example shown, a 3-phase alternating current to be fed into grid 4. For this, the alternating current generated by inverter 16 is stepped up by means of transformer 18 so as to be fed into grid 4 on grid connection point 2. Illustrated transformer 18 uses a star delta connection, namely and primarily a star connection and, secondarily, a delta connection, which is illustrated here merely as an example of one embodiment. The feeding into grid 4 can also include, besides the feeding in of active power P, the feeding in of reactive power Q, which is illustrated by arrow 20. For the concrete feed-in, inverter 16 is controlled by respective control unit 22, whereby control unit 22 can be structurally combined with inverter 16. FIG. 2 is to illustrate the basic construction, and the specific arrangement of the individual elements can be chosen differently than illustrated here. For example, transformer 18 can be provided outside tower 14.

In particular, control unit 22 controls inverter 16 such that the manner of the feed into the grid is controlled. Tasks are thereby performed, such as adjusting the current that is to be fed to the situation in grid 4, in particular the frequency, phase and amplitude of the voltage in the grid. In addition, control unit 22 is designed to control the portion of the active power P and reactive power Q of the power that is actually fed into grid 4. Here, measurements are performed in grid 4, in particular on grid connection point 2, and are evaluated accordingly. Among other things, the actual voltage in grid 4 is measured, in particular in the form of the actual effective value of the voltage, and compared with the default value for the voltage, namely default value $V_{SET}$.

Accordingly, the illustrated system, and in particular inverter 16 with control unit 22, form a voltage control system, which is abbreviated as VCS.

To control the generator of the wind power installation, power control block 24 and power evaluation block 26 are provided in the area of the nacelle. In the example of the illustrated embodiment, power control block 24 particularly controls the excitation, namely the excitation current of the separately excited synchronous generator. Power evaluation block 26 evaluates the power led to rectifier 8, and compares it with the output power released by rectifier 8 over DC current line 10 to inverter 16. The result of this evaluation is forwarded to power control block 24.

FIG. 2 also illustrates that the system shown should have a voltage control system for an intelligent feed-in so as to operate the wind power installation as stably as possible, in particular near a stability boundary.

Figure 3:
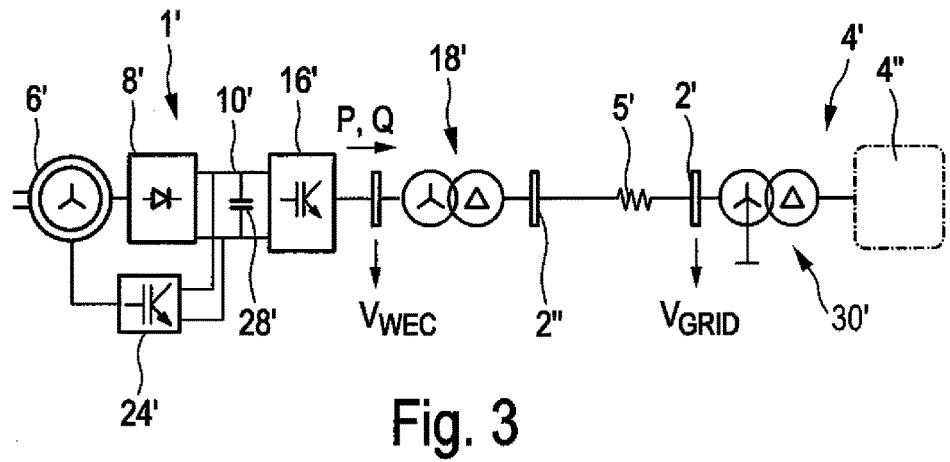
FIG. 3 shows a schematic view of a circuit arrangement of a voltage controlled feed-in of a wind power installation into an AC grid.

FIG. 3 illustrates the connection of wind power installation 1' to so-called weak grid 4'. A weak grid here refers to a grid with high impedance. This is illustrated in FIG. 3 by means of serial impedance 5'. In addition, said serial impedance 5' was provided in a test structure that corresponds to the structure in FIG. 3, and which was used to examine the behavior of wind power installation 1' on weak grid 4'.

The structure of FIG. 3 assumes generator 6', which is driven by the wind and provided as a synchronous generator. The generated electrical power of generator 6' is rectified in rectifier 8', and provided to inverter 16' on the input side on a DC link with intermediate circuit capacitor 28'. The structure shown compares DC line 10' with the DC link of inverter 16' on the input side to simplify the illustration. A DC line on the input side can indeed be electrically identical with an intermediate circuit, or a boost converter is provided on the input side, which is not explained in detail here. Rectifier 8' and inverter 16' can also be physically separated from each other, as already explained in FIG. 2 with regard to rectifier 8 and inverter 16.

Finally, exciter control 24' is provided, which can be fed with energy from the DC link that is represented by intermediate circuit capacitor 28'. Said exciter control 24' controls the excitation current of separately excited generator 6' and basically corresponds to power control block 24 of FIG. 2.

Inverter 16' can feed in active power P and/or reactive power Q. FIG. 3 states the voltage of inverter 16' on the output side as voltage of the wind power installation $V_{WEC}$. For the feed-in, this is stepped up by transformer 18, and then fed into grid 4' on grid connection point 2'. Here, grid 4' also comprises grid transformer 30'. The actual grid that starts after grid transformer 30' is specified with the reference sign 4". The voltage on grid connection point 2' is referred to as grid voltage $V_{Grid}$.

To illustrate the weak grid, serial impedance 5' is shown in front of grid connection point 2'. Said serial impedance 5' exists only in this test structure or illustrating structure, and indicates the grid impedance. Therefore, the point shown directly next to transformer 18' can also be referred to as grid connection point 2". This differentiation between these two grid connection points 2' and 2" only results from this use of serial impedance 5', and usually does not exist in this form in real grids.

Figure 4:
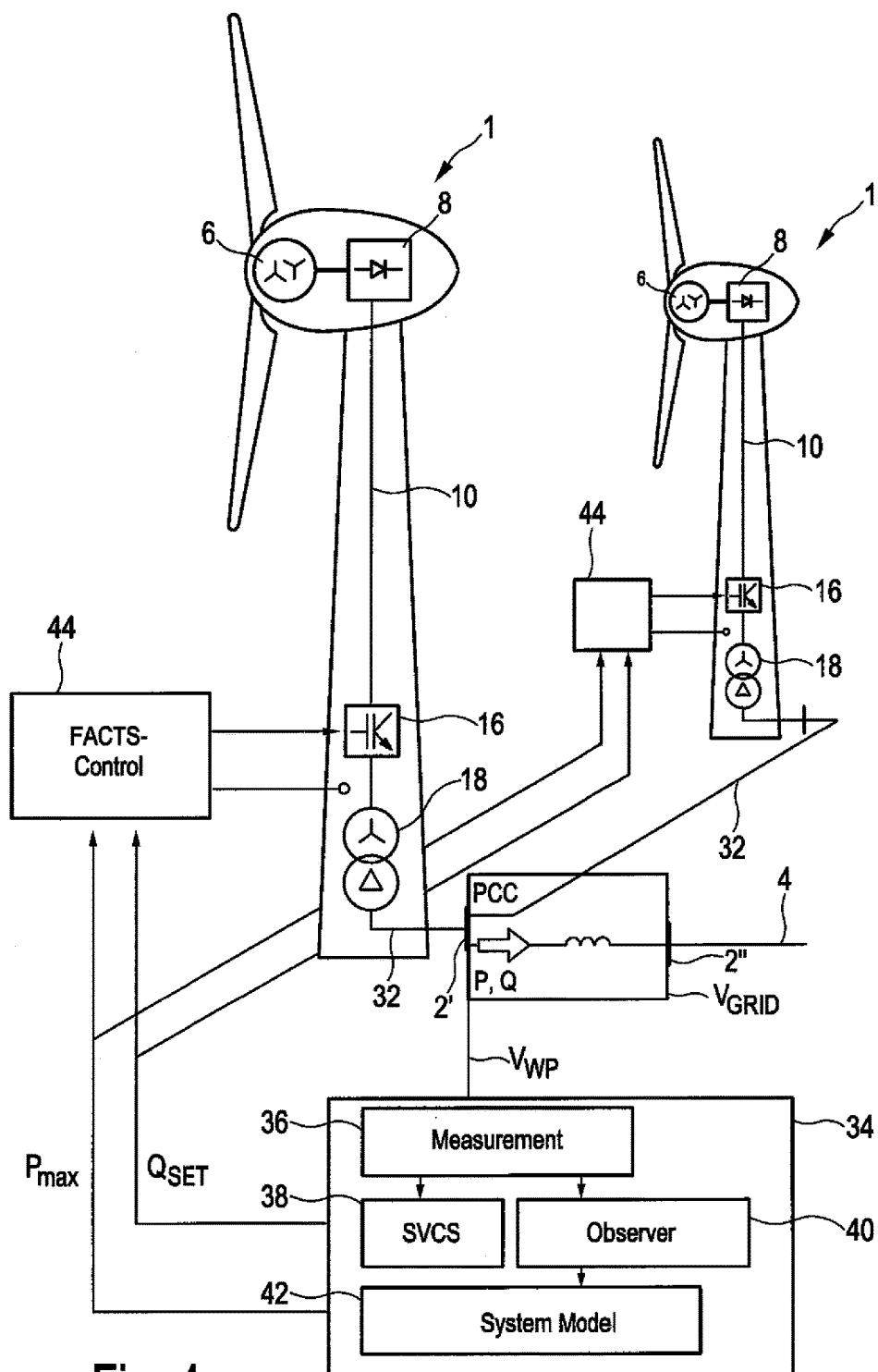
FIG. 4 shows a schematic view of two wind power installations connected to a grid over a joint grid connection point.

FIG. 4 shows another illustrative and schematic example, according to which two wind power installations 1 are connected to supply grid 4. Each wind power installation 1 is basically designed as explained in FIG. 2, namely with generator 6, rectifier 8 and DC line 10, which indeed comprises at least two individual lines, namely for positive and for negative current, which also applies to DC line 10 of FIG. 2. Furthermore, wind power installation 1 comprises inverter 16 and transformer 18. Access line 32 leads from each of the two wind power installations 1 to a or the grid connection point 2' on the wind power installation side. Thus, these two wind power installations 1 shown as examples, which can be representative for a wind park with far more than wind power installations, feed their generated power jointly on this grid connection point 2' on the wind power installation side. The fed-in power P and the fed-in reactive power Q, if present, is then led to connection point 2" on the grid side, and fed into electrical supply grid 4.

The connection between grid connection point 2' on the wind power installation side and connection point 2" on the grid side cannot be ignored, and accordingly, the voltage $V_{WP}$ is reached on grid connection point 2' on the wind power installation side, whereas the voltage $V_{Grid}$ is reached on connection point 2" on the grid side.

The voltage $V_{WP}$ on the wind power installation side is determined and evaluated in evaluation block 34 for control. The evaluation is at first performed in such a way that the measured values are recorded with measuring block 36. The measurement results are forwarded, amongst other things, to stability control block 38, which can also be referred to as SVCS (Stability Voltage Control System) block. Stability control block 38 calculates a default value $Q_{Set}$ for the reactive power that is to be provided. This reactive power that is to be reached is then transferred as respective default value to both wind power installations 1, and accordingly would be transferred to all wind power installations in one amount. This default value can be transferred as an absolute value, in particular if wind power installations 1 have the same size and are subject to the same wind conditions. However, it can also be provided as a default value, such as a percentage value which refers to properties of the respective wind power installation, e.g., as the nominal capacity of the relevant wind power installation.

Further, measuring block 36 transmits the values to observer block 40, which calculates further conditions on the basis of the determined measurement values, such as the fed-in active power or the fed-in reactive power, and transmits its results to system model block 42. Observer block 40 can also obtain or derive information on the power demand, if necessary.

The system model of system model block 42 is used to determine a maximum active power $P_{max}$ that is to be fed in, and to feed it to wind power installations 1. This maximum active power that is to be fed in can be provided as an absolute or relative value. It is noted that the illustration of evaluation block 34 is to explain the structure. In general, it is not necessary that evaluation block 34 be physically designed as an independent device.

The preset reactive power $Q_{set}$ and the maximum active power $P_{max}$ are then transferred to the FACTS control block 44 of each wind power installation 1. The term "FACTS" is also used in the German language and is an abbreviation for "Flexible AC Transmission System". The FACTS control block 44 then implements the default values and controls inverter 16 accordingly, whereby it can also consider measurement values from the wind power installation conditions.

In particular, but not exclusively, evaluation block 34 can provide stability relevant defaults for a stable feed into grid 4. In particular, an operating point can be set that is favorable with regard to the amount of energy to be fed or with regard to the amount of power and stability. In particular, an operating point with a stability reserve can be determined here. Here, stability control block 38 can reach a stability reserve with regard to reactive power that is to be fed-in by means of a respective default of the reactive power $Q_{set}$.

Figure 5:
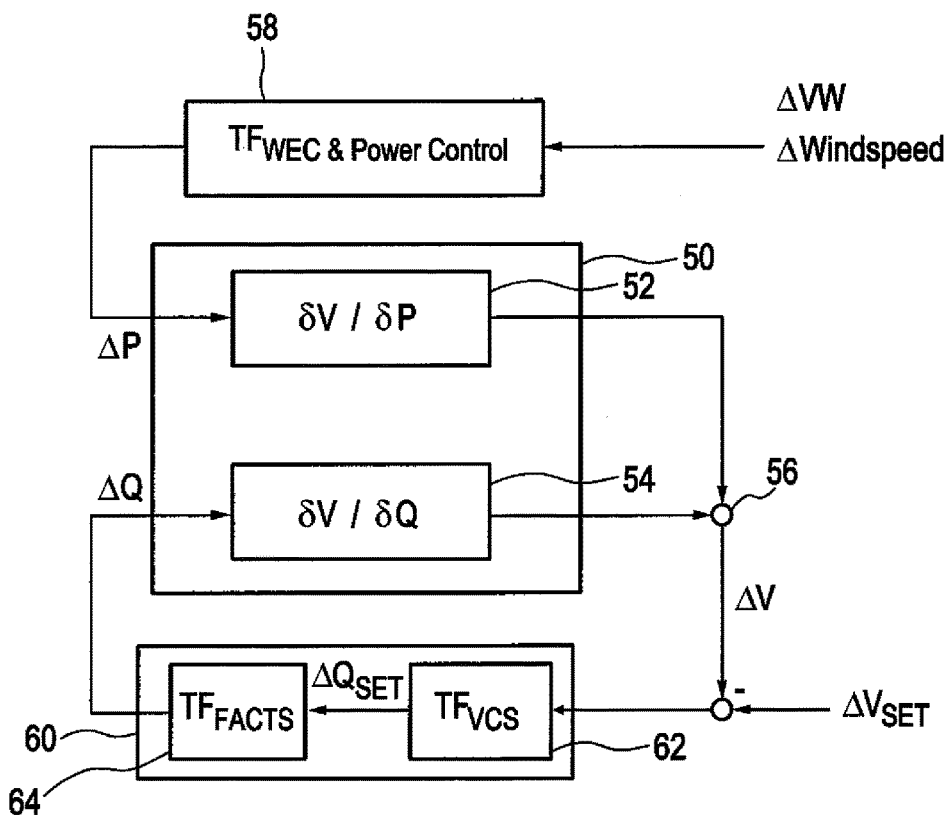
FIG. 5 illustrates parameters that can influence the sensitivity of a wind power installation connected to a grid.

FIG. 5 illustrates the sensitivity of a wind power installation connected to a grid and the corresponding influencing factors. Grid block 50 of FIG. 5 is specified representatively for the grid behavior, namely on the grid connection point. Grid block 50 illustrates that the grid can react to influences due to a change in voltage. All influences are illustrated here as changes of the active power ΔP and changes of the reactive power ΔQ. Active power block 52 considers influences of power changes, and reactive power block 54 considers influences of changes in reactive power. Active power block 52 shows a partial derivation of the voltage on the basis of the active power, and accordingly, reactive power block 54 shows a partial derivation of the voltage on the basis of the reactive power. This is a possibility to consider the respective dynamics of the grid behavior, i.e., the grid sensitivity, namely reactions to changes in the active power and the reactive power, by means of respective partial derivations, the results of which are added in summing block 56. Grid block 50 together with summing block 56 thus consider a dependency of the grid voltage on the grid connection point on two variables, namely the active power and the reactive power. The dependency is here considered by the partial derivations.

Changes in the active power result in particular from changes in the wind velocity ΔVW, which impacts wind power installation block 58. This wind power installation block 58 illustrates the influence of the change in wind velocity ΔVW upon the change in active power ΔP, whereby the control of the wind power installation is also to be considered, and is considered by this block 58.

The change in reactive power ΔQ can also depend on the wind power installation, or at least the control of the wind power Installation; however, it generally depends on other contexts that are independent of the wind velocity. Its change is illustrated by control block 60. For explanatory purposes, this control block 60 is divided into reactive power default block 62 and FACTS block 64. Control block 60, and thus reactive power default block 62, are initially dependent on a voltage deviation ΔV, namely on the grid connection point, less a predetermined voltage deviation $ΔV_{SET}$. On the basis of this resulting voltage deviation, reactive power default block 62 determines a reactive power that is to be fed in or, depending on a voltage change, a predetermined change of the reactive power to be fed in. This is forwarded to FACTS block 64, which accordingly implements the feed-in of the reactive power or the change in the feed-in of the reactive power.

Wind power installation block 58 and control block 60 can also be understood as a transfer function of the respective input value, and reactive power default block 62 and FACTS block 64 can each be understood as individual transfer functions that are interlinked in control block 60

Figure 6:
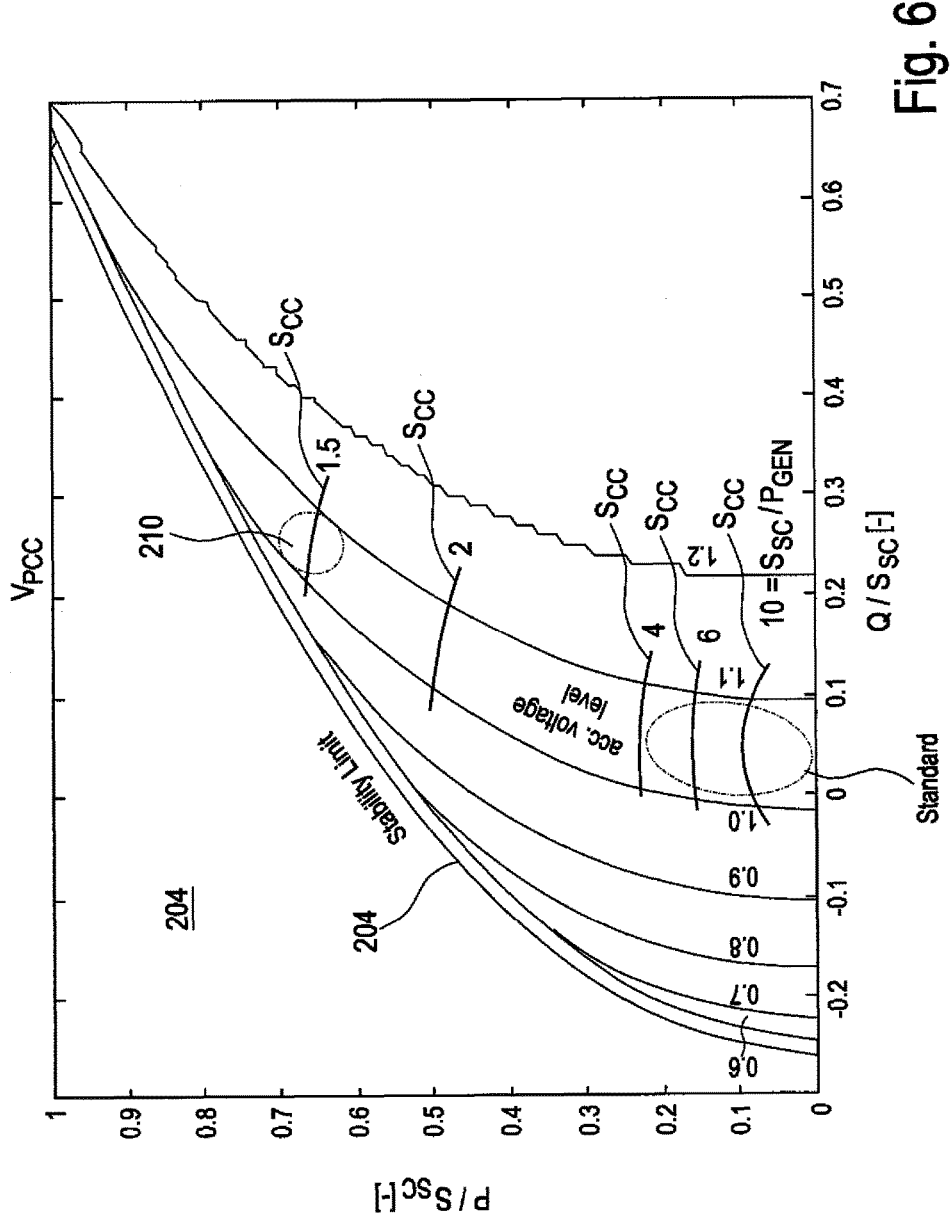
FIG. 6 shows a diagram analyzing the grid behavior on the grid connection point as voltage courses depending on the fed-in reactive power and fed-in active power.

FIG. 6 shows a dependency of the voltage for one embodiment on the grid connection point on the basis of fed-in reactive power Q and fed-in active power P. Reactive power Q is standardized to the short circuit power $S_{SC}$ of the grid on the examined grid connection point, and plotted on the abscissa. Power P is also standardized to short circuit power $S_{SC}$ of the same grid connection point, and established on the ordinate. Voltage $V_{PCC}$ is the voltage on the grid connection point standardized to nominal voltage $V_N$. This standardized voltage on the grid connection point is plotted as a graph for different values respectively and depending upon standardized reactive power Q and standardized active power P. Accordingly, the graph or the characteristic with the value 1 is the characteristic representing the reactive power and active power values required to achieve nominal voltage.

For example, nominal voltage is achieved if 10% of reactive power Q and 50% of active power P is fed in with regard to short circuit power $S_{SC}$.

The graph of FIG. 6 shows characteristics of a grid connection point of a grid with high impedance, at least with regard to this grid connection point.

Usually, for the illustrated grid connection point of the grid example, a feed-in would be realized within a standard operating range 200. The feed-in would thus be realized with an active power P of approx. 10% of short circuit power $S_{SC}$, with a feed-in of approx. 5% of the reactive power of short circuit power $S_{SC}$. Under the idealized assumption that fed-in active power P corresponds to the rated power or connected load of the generator or the sum of the generators connected to the grid connection point, the feed-in of 10% of short circuit power $S_{SC}$ would mean that connected load $P_{Gen}$ is 10% of the short circuit power $S_{SC}$. Short circuit current ratio $Scr=S_{SC}/P_{Gen}$ is therefore approx. 10. This corresponds to approx. the center of the illustrated standard operating range 200. FIG. 6 shows further short circuit current ratios Scr as short dashes for orientation, namely for the values for Scr of 10; 6; 4; 2 and 1.5.

According to one or more embodiments of the invention, however, it is proposed to feed in significantly more active power P, namely within the range of 60% to 70% of short circuit power $S_{SC}$. Accordingly, a feed-in of 20% to 30% of reactive power Q related to short circuit power $S_{SC}$ is to be provided in order for this to maintain the voltage on the grid connection point within the range of 100% to 110% of the nominal voltage. As a precautionary measure, it is pointed out that the feed-in of 110% of the nominal voltage on the grid connection point does not mean that an increased voltage of 110% can be measured on the consumer side. Firstly, there is usually a considerable grid section between the grid connection point and the first relevant consumer. Secondly, step transformers can be provided in the grid, which can provide a balance to a certain extent. The measures to be taken thereon, which depend on the individual grid, including consumer and producer and various other framework conditions, cannot be addressed in this application. An expert is usually familiar with the required measures.

This proposed section is shown in FIG. 6 as increased operating range 210. This increased operating range has a short circuit current ratio Scr of approx. 1.5. No noteworthy producer has been connected to the grid so far with such short circuit current ratio.

The illustration of FIG. 6 is the result of a grid analysis of the underlying grid with regard to the relevant grid connection point. For this purpose, as explained above, the relevant elements in the grid were analyzed and determined respectively by solving the Jacobian matrix. This results in the present illustration of FIG. 6, according to which, in simple terms, the characteristics to the right side, i.e., with higher fed-in reactive power Q, also reflect increased voltages on the grid connection point. With decreasing reactive power Q, i.e., to the left side, the voltage on the grid connection point decreases. However, reactive power Q cannot decrease arbitrarily, and with too low (already negative) a reactive power Q, the Jacobian matrix becomes singular, according to the associated active power P, i.e., impossible to solve in mathematical terms. A singular Jacobian matrix means that there is an instable condition. This results in stability boundary 202, which is accordingly shown on the left-hand side of the illustration in FIG. 6. The area to the left of stability boundary 202, which has a higher active power P, and/or a lower reactive power Q, respectively, is instable area 204. As a purely precautionary measure, it is pointed out that stability boundary 202 does not coincide with a single characteristic of a voltage value on the grid connection point, but rather seems to cut the plurality of characteristics. However, a plurality of characteristics cannot be cut, as there are no values, and thus no plurality of characteristics, beyond stability boundary 202.

The preferably operating range, namely increased operating range 210, has a smaller distance to stability boundary 202 than standard operating range 200. However, it should be noted that no specific considerations or analyses were made with regard to the grid characteristics, as shown in FIG. 6. In particular, the distance to a stability boundary, as it is shown in FIG. 6 as stability boundary 202, was not known, at least not in the quality and quantity shown in FIG. 6. Rather, the installation of large power plants is oriented to the criterion of the short circuit current ratio, and this is as large as possible, preferably over (or even significantly over) 10. Small producers, such as wind power installations, have so far usually been connected to strong grids that were easily able to cope with the connection of another wind power installation. As a result, the connection was made, be it intentionally or not, with high short circuit current ratio.

The proposed solution accurately analyzes the grid with regard to the provided grid connection point, in particular by quantitatively incorporating contexts as shown in FIG. 6—and preferably in FIGS. 7 and 8, which will be explained below. In particular, such an analysis is performed by a repeated formation and solution of the Jacobian matrix for diverse points. Based on such a grid analysis, a stability boundary according to stability boundary 202 can be determined, and a desired operating range according to increased operating range 210 in FIG. 6 can be chosen.

In addition, it is proposed that the wind power Installation be controlled in the meaning of a closed control loop, as is shown in particular in FIG. 2 and FIG. 4. In FIG. 2, the control loop basically comprises inverter 16, transformer 18 and control unit 22, considers measurement values on grid connection point 2 and controls inverter 16 so as to achieve the fed-in active power P and the reactive power Q according to arrow 20. The control can also impact the control of the wind power installation in the area of generator 6; however, the described control loop comprising inverter 16, transformer 18 and control unit 22 does not require mechanical elements and is able to react very quickly. For this, the knowledge of the grid characteristics on the grid connection point, i.e., grid connection point 2 according to FIG. 2, can also be considered, in particular in control unit 22. Thus, a quick control can be implemented which recognizes the grid behavior on the grid connection point, particularly the stability boundary. This makes it possible to operate the wind power installation or the wind park—and other producers, if applicable—within a desired operating range, such as the increased operating range 210 of FIG. 6, and at the same time to ensure high stability and safety.

Figure 7:
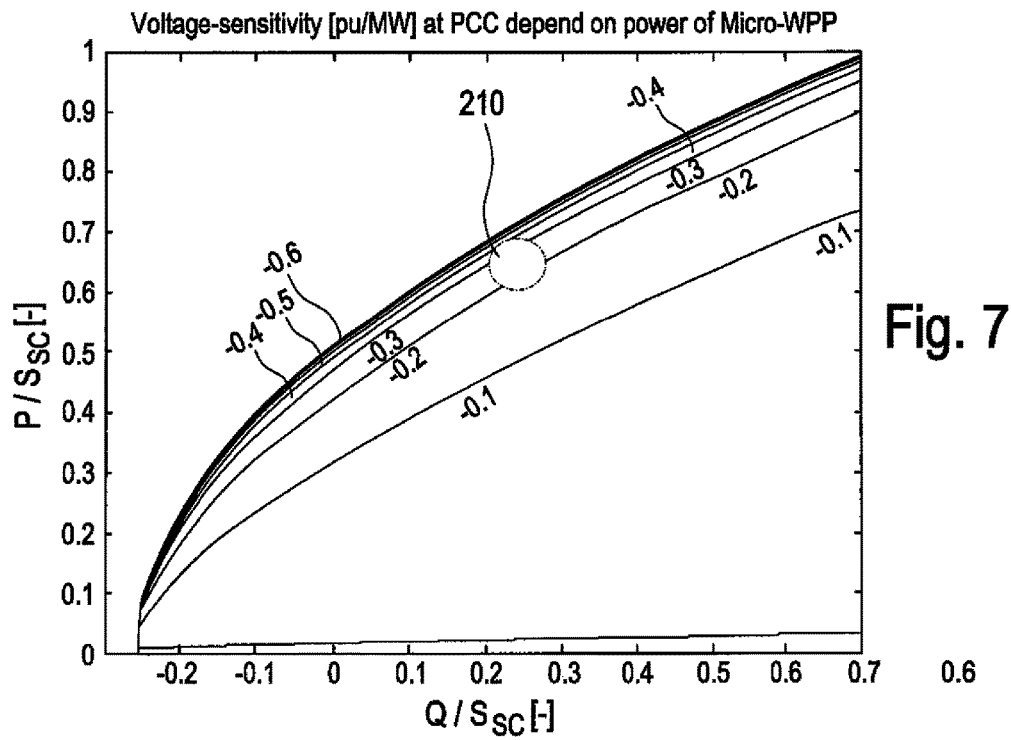
FIG. 7 shows a sensitivity as a voltage change caused by changes of the active power depending on the fed-in and standardized reactive power and active power.
Figure 8:
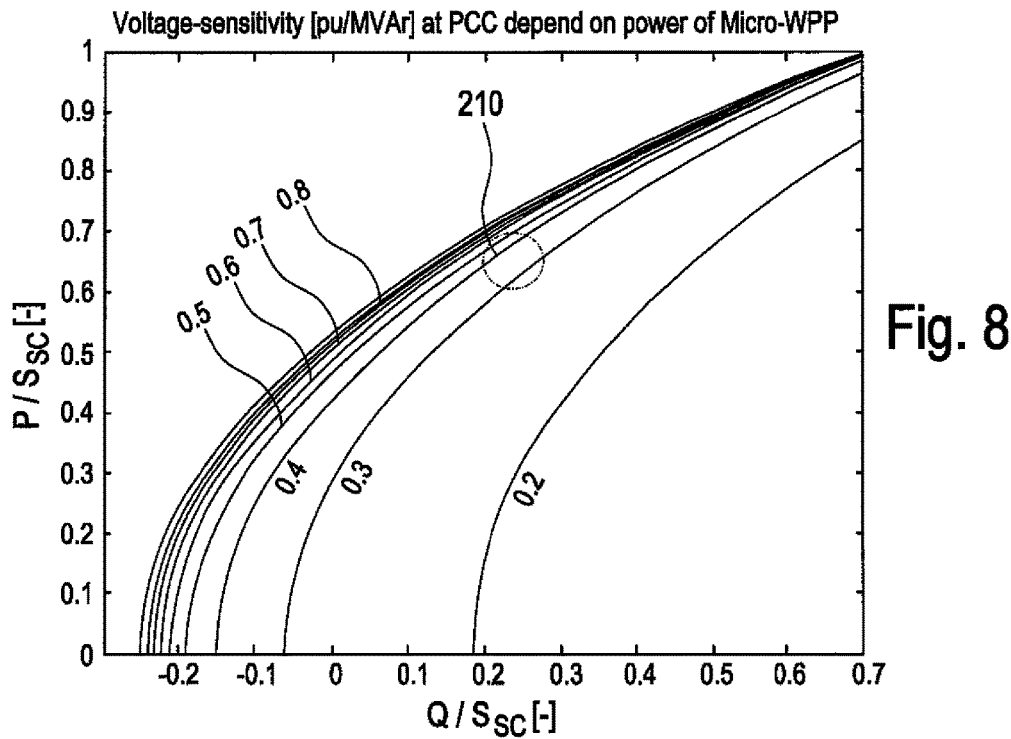
FIG. 8 shows a sensitivity as a voltage change caused by a change of the reactive power depending on the standardized reactive power and active power.
Figure 9:
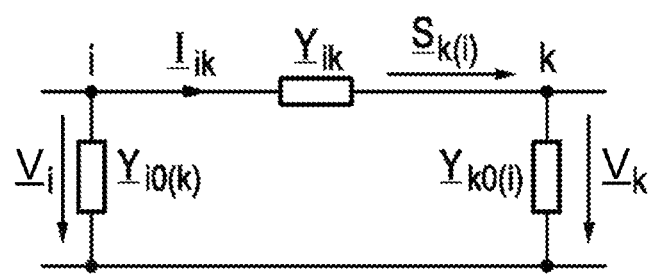
FIG. 9 shows a generalized grid illustration.

FIGS. 7 and 8 show the voltage sensitivity depending on reactive power Q and active power P. FIGS. 7 and 8 thus use the same values on the abscissa and the ordinate, namely standardized reactive power on the abscissa and standardized active power on the ordinate.

The voltage sensitivity shown is the change in voltage with the change in active power pursuant to FIG. 7 or the change in voltage with the reactive power pursuant to FIG.

8. In other words, the partial derivation of the voltage on the grid connection point according to the active power in FIG. 7 and the partial derivation of the voltage according to the reactive power in FIG. 8 are illustrated. FIG. 7 thus shows the behavior of active power block 52 of FIG. 5. FIG. 8 shows the behavior of reactive power block 54 of FIG. 5, whereby in both cases, the illustration is shown depending on the operating points, which are determined by the currently fed-in reactive power Q and the fed-in active power P. The values of the respective characteristics relate to a grid connection point with a short circuit power $S_{SC}$=3.73 MVA, to which two wind power installations with a rated power of 2 MW each are to be connected as an example. Thus, this test arrangement allows the performance of tests with a short circuit current ratio of a little less than 1. However, for the tests performed, the respective actual power of the test wind farm was used as a basis, and determined as a connected load of the target wind farm, i.e., the (fictitious) wind farm that is to be examined.

With regard to the present embodiment, i.e., the exemplary configuration, the change in the standardized voltage related to a change in power P in MW or a change in reactive power Q in MVAr is described. FIGS. 7 and 8 also illustrate the desired, i.e., the increased operating range 210. Therefore, the voltage sensitivity with regard to changes in active power according to FIG. 7 is approx. −0.2 to −0.4. The voltage sensitivity in increased operating range 210 with regard to changes in the reactive power according to FIG. 8 is approx. 0.3 to 0.5. It is therefore proposed that, when designing the wind power installation, it be connected to the concrete grid connection point, to incorporate and consider this voltage sensitivity in the control with regard to changes in the active power, as shown in the example in FIG. 7 and/or with regard to changes in the reactive power, as shown in the example in FIG. 8. In particular, these values are to be considered in the control as well, and preferably also in the design of the control. Preferably, a controller amplification is chosen depending on the sensitivity, in particular the voltage sensitivity.

In particular, it is proposed to consider these values in the closed loop, as schematically realized by the elements shown in FIG. 2, i.e., inverter 16, transformer 18 and control unit 22. Here, transformer 18 is less important; however, it must frequently be present and required to feed in a respectively high voltage already on grid connection point 2. In particular, findings concerning the voltage sensitivity in control unit 22 are considered. This way, knowing these values, it is possible to design and implement a customized control for the concrete grid connection point. This makes it possible to reduce the previously high values of the short circuit current ratio of 10 and even higher, and to provide low values, such as 1.5 for the short circuit current ratio, and thus operate the wind power installation in the increased operating range 210, which is shown in FIGS. 6 to 8.

One embodiment of the invention thus proposes in particular that a wind power installation, and finally also a wind park, no longer be connected according to the old principle of the grid parallel operation, assuming that the grid capacity is sufficient, but rather that the connection point be specifically analyzed and that the results already be considered prior to the operation, and that a customized wind power installation or wind power installation park then be connected there. Preferably, the control and the operating range that is to be chosen, in particular with regard to the reactive power Q and the active power P to be fed in, are customized and arranged closer to a stability boundary than was previously done by experts. In so doing, the benefits of a wind power installation are used in a targeted manner, namely to respond rapidly and in a targeted manner to changes, in particular changes in grid conditions. This is to avoid an excessively large size of the grid, in particular of the specific grid connection point, at least for the connection of wind power installations to the grid. Nevertheless, it is possible to maintain and even improve stability if the control or regulator recognizes the characteristics of the grid connection point or the grid very well with regard to the grid connection point, and if it observes grid conditions.

As a purely precautionary measure, it is pointed out that a regulator is basically understood as a closed loop with feedback, whereby a control basically refers to an open "loop", i.e., a situation without feedback. Nevertheless, a control block that implements a control method, can be used in a control loop. With regard to the example in FIG. 2, this means that control unit 22 is a control to the extent that it comprises a certain control function or transfer function that it can also be non-linear and/or volatile, and/or relate to several sizes. However, this control unit is used in the loop shown in FIG. 2, which basically comprises, besides control unit 22, inverter 16, transformer 18 and finally a measuring unit on grid connection point 2 with a unit of comparison 23. Control unit 22 controls the inverter and is therefore integrated in the closed loop, making it part of a control.

Figure 10:
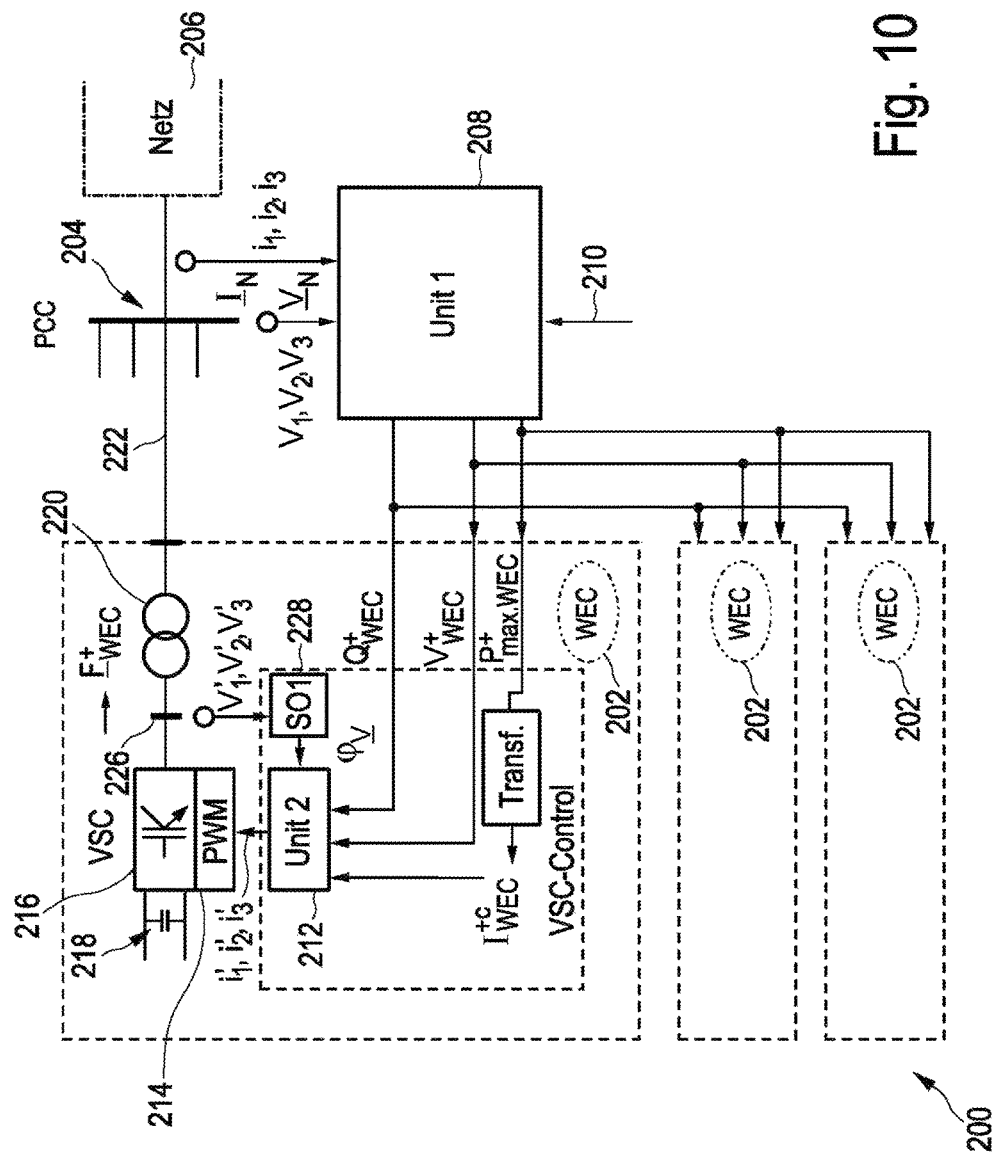
FIG. 10 shows a schematic view of a control structure for a wind park including a central control unit and a plant control unit as an example.

FIG. 10 shows a schematic view of a wind park 200, comprising in this example 3 wind power installations 202, which are indicated by the symbol WEC. Further control elements are assigned to each wind power installation 202, which is indicated by a dashed box. Such a dashed box is indicated for each wind power installation 202, whereas the assigned elements are shown in only one wind power installation, i.e., wind power installation 202 shown in in FIG. 10 above. Most of these elements can also be locally arranged in the wind power installation, e.g., in the tower of the wind power installation.

In so far as the control structures of FIG. 10 to 13 are different from the above statements mentioned with regard to FIG. 2 and FIG. 4, said above-mentioned structures of FIG. 2 to 4 are helpful as complementary explanations and useful as general explanations.

Wind park 200 is connected to electrical AC grid 206 via point of common coupling 204, which is also referred to as PCC. Electrical AC grid 206, and accordingly also point of common coupling 204, are 3-phase, which is, to simplify matters, not highlighted in FIG. 10, however, On or behind point of common coupling 204, a grid voltage $\underline{V}_N$ is measured, comprising the 3 voltage $v_1$, $v_2$ and $v_3$. In addition, the fed-in current $\underline{I}_N$ is identified on or right behind the point of common coupling 204, containing the individual current components $i_1$, $i_2$ and $i_3$. These values measured for the grid voltage $\underline{V}_N$ and the fed-in current $\underline{I}_N$ are identified continuously, and entered into central control unit 208. Central control unit 208 is provided as a central control unit for the entire wind park 200. In addition, central control unit 208 receives some default values on its default input 210, i.e., a set point value for the voltage of the positive sequence component $V_{WEC,soll}^+$, which is to be used as set point value of the clamp voltage of all wind power installations, and considers an expected voltage drop on the line between wind power installation and point of common coupling. Alternatively, such a value can also be entered here for each of the wind power installations 202. Furthermore, controller parameters are predetermined, i.e., a difference voltage, $\Delta V_t$ as well as the first and second timer time $t_A$ and $t_B$, and a reactive power increment $\Delta Q_{WEC}^+$. Furthermore, an effective impedance $\underline{Z}_{PCC\text{-}WEC}$ and, in Addition, 2 characteristic maps are predetermined. The effective impedance $\underline{Z}_{PCC\text{-}WEC}$ describes the impedance of the supply line between wind power installation 202 and point of common coupling 204. Said value can be predetermined jointly for each connection line between a wind power installation 202 and point of common coupling 204 respectively, or particularly with large deviations, for each individual wind power installation within the wind park.

Said impedance serves to compensate a voltage drop on the respective lines, which is also referred to as line drop compensation, which is only virtually possible due to the large degree of parallel connection of the individual wind power installations in a park. Said consideration is particularly made in the sense of a consideration that is effective on average. For this reason, it is preferably proposed to consider only a single impedance for the entire park.

Central control unit 208 then passes 3 set point values to wind power installation 202, i.e., the reactive power of the positive sequence component that is to be fed in $Q_{WEC}^+$, the voltage of the positive sequence component $V_{WEC}^+$, which is to be set at the output of the wind power installation, and a maximum value for the active power of the positive sequence component that is to be fed in $P_{max\ WEC}^+$.

These 3 set point values are basically predetermined for each wind power installation 202, which is only hinted at in FIG. 10.

These default values are then entered into plant control unit 212, whereby the cosine current component of the positive sequence component $I^{+c}$ is calculated on the basis of the predetermined maximum active power. For example, said component can be calculated using the following formula:

$$I_{WEC}^{+c} = Q_{WEC}^+ / V_{WEC}^+$$

In correspondence with the aforementioned, a sine component of the current of the positive sequence component of the wind power installation $I_{WEC}^{+s}$ is calculated using the formula:

$$I_{WEC}^{+s} = P_{WEC}^+ / V_{WEC}^+$$

Plant control unit 212 is explained in detail below in connection with FIG. 13. Plant control unit 212 then outputs the set point values for the currents $i_1'$, $i_2'$ and $i_3'$ that are to be set. These currents are fed to control block 214 to implement the pulse-width modulation, and said control block is also indicated as PWM in FIG. 10. PWM 214 then controls inverter 216, which receives its input energy to intermediate circuit 218. Inverter 216 therefore works based upon voltage, and is also referred to by experts as the "voltage source control" (VSC).

As a result, inverter 216 outputs a current of the positive sequence component, $I_{WEC}^+$ which feeds the joint point of common coupling 204 via transformer 220 and supply line 222 within the park. Point of common coupling 204 shows a schematic view of further connections 224 to connect further wind power installations 202.

For the internal control of the wind power installation, particularly through plant control unit 212, the 3 voltages $v_1'$, $v_2'$ and $v_3'$ are identified at output 226 of the wind power installation or of inverter 216, and entered into state observer 228, which is also indicated as SO1 in FIG. 10. On this basis, state observer 228 determines a phase angle $\varphi_V$, which is entered into plant control unit 212. The functionality of state observer 228 is described in detail in the German patent application DE 10 2009 031 017 A1. In particular, state observer 228 is described there in FIG. 4. There, the voltage $v_1$, $v_2$ and $v_3$ are specified as input values, and the phase angles $\varphi_1$, $\varphi_2$ and $\varphi_3$ as output values. The content of said German patent application should therefore also be seen as the content of the present application. In any case, the description of the state observer according to FIG. 4 of the German patent application should be part of the present application. A U.S. application Ser. No. 13/381,302 exists along with the German patent application.

Accordingly, central control unit 208 measures the voltages and the total current at connection point 204 of the wind park.

Figure 11:
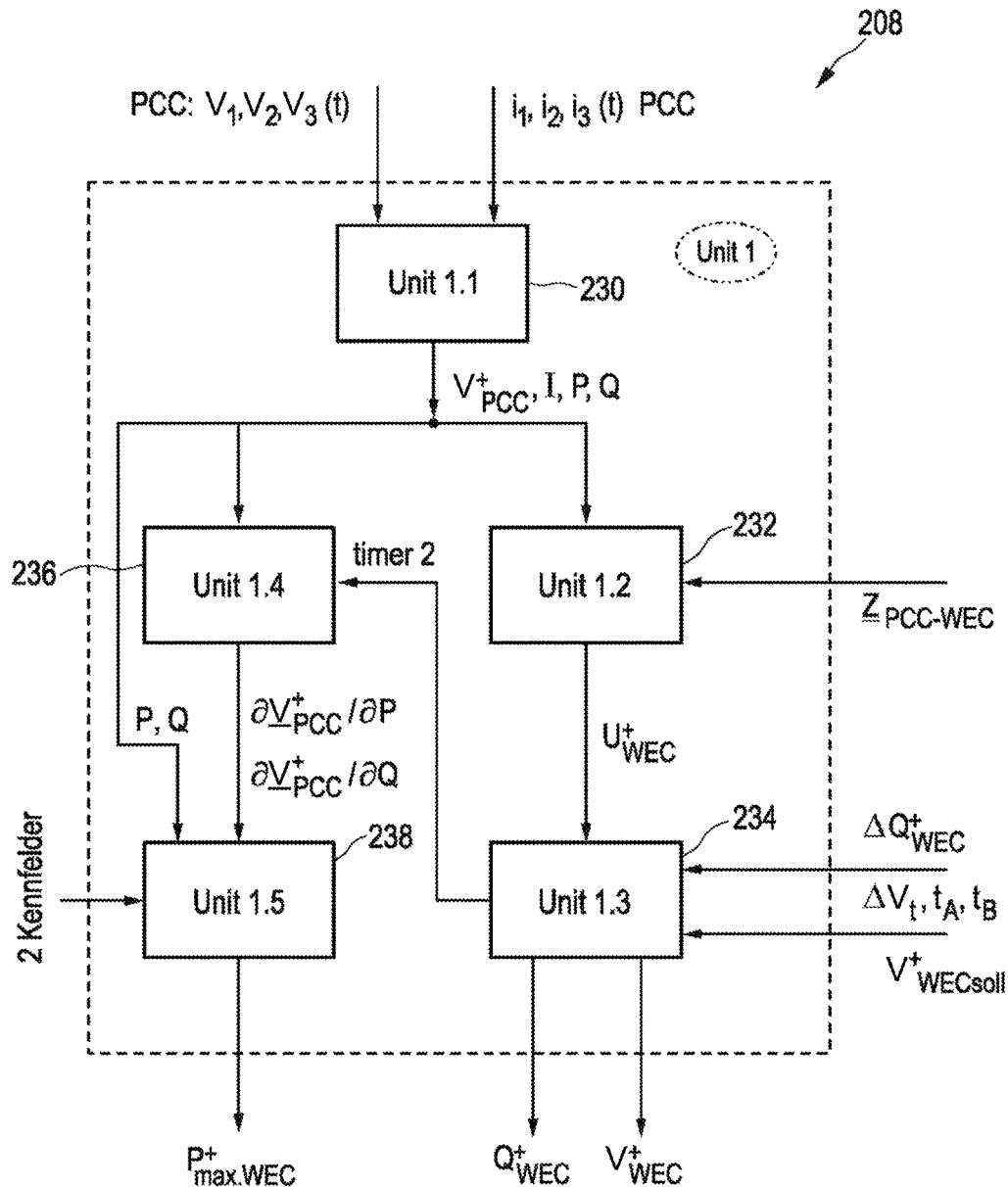
FIG. 11 shows a schematic view of the structure of the central control unit shown in FIG. 10.

The setup of central control unit 208 is illustrated in FIG. 11. Accordingly, the voltages $v_1$, $v_2$ and $v_3$ are measured at the point of common coupling 204 and currents $i_1$, $i_2$, and $i_3$ are measured there as well are input measurements for central control unit 208. Said voltages and currents are instantaneous values and are entered into calculation block 230, which is also indicated as Unit 1.1 in FIG. 11.

On the basis of the entered currents and voltages, which are measured on point of common coupling 204, for example with a sampling rate of 5 KHz, calculation block 230 calculates the fed-in active and reactive power P and Q, as well as the current I and the voltage of the positive sequence component $V_{PCC}^+$. The breakdown of a 3-phase system (such as, in this case, a 3-phase voltage according to the method of the symmetrical components) into a positive sequence component and a negative sequence component is basically known. The calculation in this calculation block 230 can, for example, be carried out as described in German patent application 10 2011 084 910.6 in connection with FIG. 3.

Estimation block 232, which is also indicated as Unit 1.2 in FIG. 11, calculates or estimates, on the basis of the values measured at the point of common coupling 204 or on values derived thereof, the voltage that is to be expected on the clamps of the wind power installation, i.e., the positive sequence component voltage $U_{WEC}^+$ $V_{WEC}^+$ on the clamps of the wind power installation, particularly on output 226 of inverter 216. For this purpose, the voltage of the positive sequence components at the point of common coupling $V_{PCC}^+$, the current I and the phase angle $\varphi = \arctan(Q/P)$ are used. Furthermore, the effective impedance between the point of common coupling and the wind power installation $\underline{Z}_{PCC\text{-}WEC}$ is required, which was previously determined, and is entered here in central control unit 208 and in estimation block 232. Basically, a voltage drop on the connection line between the wind power installation to the point of common coupling is considered. This voltage drop is considered or compensated. The identified and calculated voltage of the positive sequence component on the wind power installation $V_{WEC}^+$ is an estimation for an equivalent, i.e., for an assumed virtual voltage.

Control block 234, also indicated in FIG. 11 as Unit 1.3, is an important element of central control unit 208. Said control block 234 is explained in detail below in connection with FIG. 12. In any case, it receives the positive sequence component voltage of the wind power installation as an input value, $V_{WEC}^+$ as well as several controller parameters, i.e., $\Delta Q_{WEC}^+$, $\Delta V_r$, $t_A$, $t_B$ and the voltage set point value of the wind power installation $V_{WECsoll}^+$.

Control block 234 outputs the voltage of the positive sequence component of the wind power installation $V_{WEC}^+$, basically relays the value, and outputs a set point value for the reactive power of the positive sequence component that is to be fed in through the wind power installation $Q_{WED}^+$. Furthermore, control block 234 outputs a timer2, which is required by the sensitivity block 236, and passed on to said sensitivity block. Sensitivity block 236 is also indicated as Unit 1.4 in FIG. 11.

Sensitivity block 236 determines the grid sensitivity on the basis of the values calculated in calculation block 230 based on the measurements at the point of common coupling. The calculation is conducted with the following formulas:

$$\partial V_{PCC}/\partial P := \Delta V_{PCC}^+/\Delta P$$

$$\partial V_{PCC}/\partial Q := \Delta V_{PCC}^+/\Delta Q$$

The difference that is taken as a basis for said calculation refers to values that belong to different points of time, and accordingly, those calculated values are taken as a basis which result from the time interval of the value of timer2, particularly at a time when timer2 has the value 0, and at a time when timer2 has its maximum value, which is described by the following formulas:

$$\Delta V_{PCC}^+ = V_{PCC}^+(\text{timer2=max}) - V_{PCC}^+(\text{timer2=0})$$

$$\Delta P = P(\text{timer2=max}) - P(\text{timer2=0})$$

$$\Delta Q = Q(\text{timer2=max}) - Q(\text{timer2=0})$$

The value timer2=0 therefore describes the values that were recorded or determined directly before timer2 has been set or started.

Accordingly, sensitivity block 236 outputs the grid sensitivities, i.e., with regard to the change in active power or reactive power, i.e., $\partial V_{PCC}/\partial P$ and $\partial V_{PCC}/\partial Q$.

Finally, a characteristic map block 238 exists, which is also indicated as Unit 1.5 in FIG. 11.

Said characteristic map block 238 receives the active power and reactive power and the grid sensitivity as input signals. In addition, characteristic maps are entered and stored there, i.e., as a result of a previously conducted grid analysis. Characteristic map block 238 therefore contains the grid sensitivity $\partial V_{PCC}/\partial P$ and $\partial V_{PCC}/\partial Q$ as values that were previously recorded and stored in characteristic maps, i.e., in 2 characteristic maps, and as current values for the current operating point, which results from the current value of the fed-in active power and the current value of the fed-in reactive power. Here, the 2 grid sensitivities are compared respectively, i.e., the previously stored one with the currently recorded, i.e., $\partial V_{PCC}/\partial P$ of the grid analysis with $\partial V_{PCC}/\partial P$ of the current operating point and $\partial V_{PCC}/\partial Q$ the grid analysis with $\partial V_{PCC}/\partial Q$ for the current operating point.

Preferably, a stability boundary is also stored here, and a distance from the current operating point to the stability boundary is identified. If the current operating point falls short of a predetermined distance to the stability boundary, and/or if there is a striking deviation of the sensitivity that is to be expected, i.e., the previously recorded grid sensitivity of the currently identified grid sensitivity that is stored in characteristic maps, the maximum active power $P_{maxWEC}$ that is to be fed in is reduced. Said value is output accordingly at characteristic map block 238.

Figure 12:
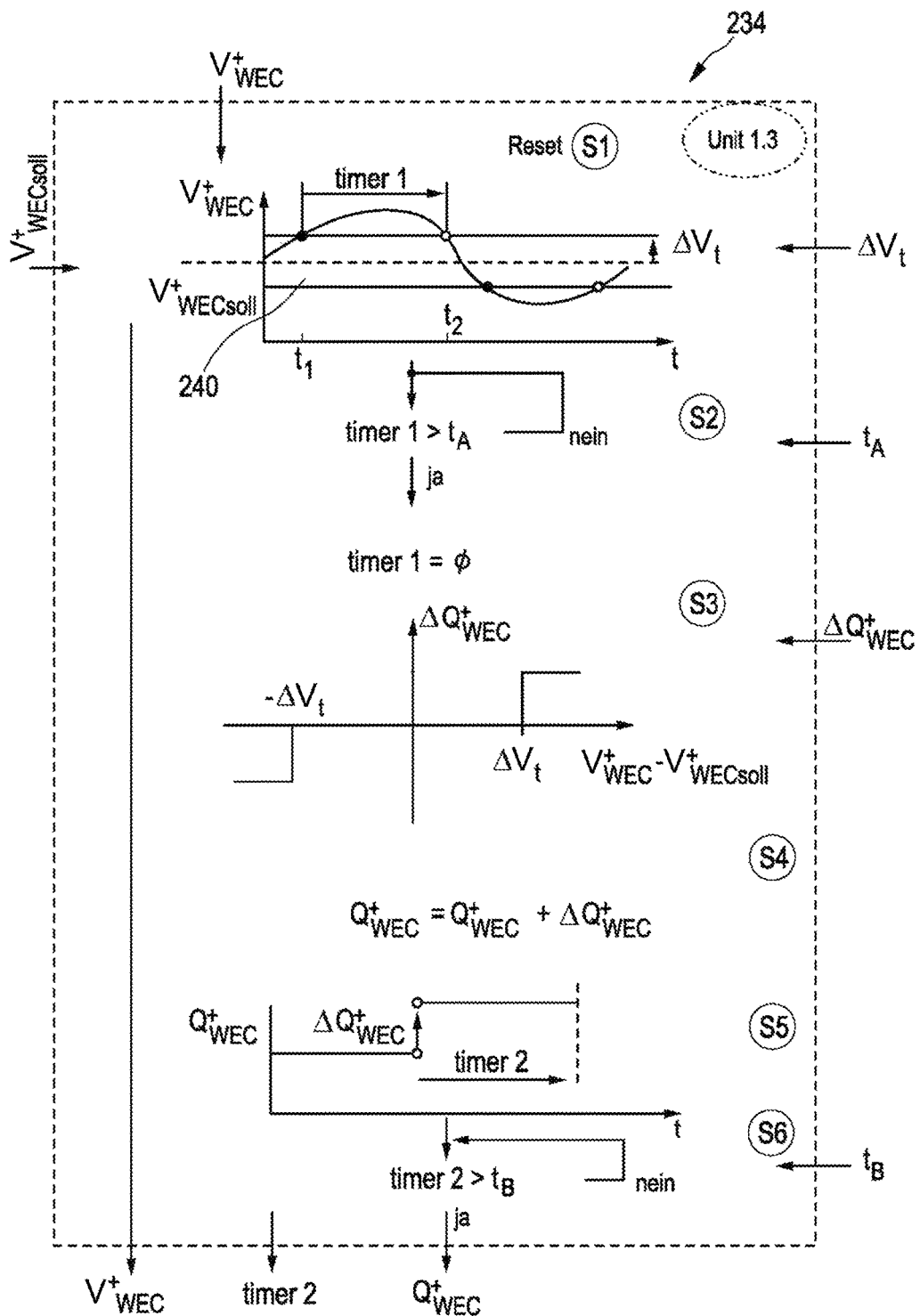
FIG. 12 shows a schematic view of an sub-control block shown in the central control unit of FIG. 11.

Control block 234—Unit 1.3—is described in detail in FIG. 12, also in the sense of a schematic flowchart. In step S1, the positive sequence component voltage of the wind power installation $V_{WEC}^+$ is compared with a respective set point value, i.e., $V_{WECsoll}^+$. The voltage of the positive sequence component on the wind power installation $V_{WEC}^+$ is the virtual voltage, which was determined by estimation block 232 according to the measured voltage at the point of common coupling and the consideration of the effective impedance. In said step S1, it is at first examined whether said virtual voltage $V_{WEC}^+$ is in tolerance band 240. Here, tolerance band 240 is a band the margins of which around the predetermined difference voltage $\Delta V_t$ are over or under the voltage set point value $V_{WECsoll}^+$.

If the voltage, for example, exceeds the tolerance band at the time t1, a first timer1 is started.

Then, the time is measured that passes until the point in time $t_2$, when the voltage returns to tolerance band 240. A similar procedure is possible if the voltage leaves the tolerance band downwards, as is indicated in the graph in step 1.

The logical step S2 describes the behavior of timer1. Steps S1 and S2 and further steps described below basically take place simultaneously, and can also take place simultaneously. Said steps S1 and S2 thus describe partial functions or partial processes or functionalities of control block 234.

Step S2 explains that timer1 increments until it exceeds the value $t_A$. In said case in which the value is exceeded, timer1 is set to 0, and the acceleration loop described in step S2 starts over again. If the voltage in the tolerance band returns before timer1 has exceeded the value $t_A$, timer1 is again set to 0, and remains there until the voltage again leaves tolerance band 240. Nothing else is triggered.

However, if timer1 has exceeded the value $t_A$, the predetermined reactive power is changed suddenly or by one step, which is explained in step S3. Therefore, a reactive power difference of the positive sequence component $\Delta Q_{WEC}^+$ is predetermined if difference $V_{WEC}^+ - V_{WECsoll}^+$ exceeds the value $\Delta V_t$ or falls short of the value $-\Delta V_t$. Accordingly, a difference reactive power value of the positive sequence component $\Delta Q_{WEC}^+$ or a respective negative value $-\Delta Q_{WEC}^+$ is set. The predetermined reactive power value of the positive sequence component for the wind power installation $Q_{WEC}^+$ is then, on the basis of its current value, changed by the difference value, i.e., increased by one step, if the voltage has left tolerance band 240 upwards, or decreased by one step, if the voltage has left tolerance band 240 downwards. This is shown in the equation in step S4. Therefore, the value $\Delta Q_{WEC}^+$ is the amount of the step.

By changing the reactive power of the wind power installation by one step, a timer2 is additionally initiated. This is illustrated by step S5 for the example that the reactive power of the positive sequence component of the wind power installation $Q_{WEC}^+$ is increased by the step $\Delta Q_{WEC}^+$. Correspondingly, the same applies to a decrease. Timer2 increases in a loop until said increase of the reactive power by one step is pending. If timer2 exceeds the comparative value $t_B$, it is output to timer2 so that it can be further used in sensitivity block 236. The loop for timer2 is illustrated in step S6.

It is proposed to wait for timer2 by all means, before the reactive power can be changed again. Thus, during this period, the reactive power is not reduced by one step.

Control block 234 outputs, amongst other things, the voltage set point value $V_{WECsoll}^+$ and $V_{WECsoll}^+$ is then used by the wind power installations as $V_{WEC}^+$ respectively.

In addition, the reactive power of the positive sequence component of the wind power installation $Q_{WEC}^+$ that is to be set and, if necessary, changed, is output so that it can be output in total by central control unit 208, and passed to the respective plant control unit 212, as shown in FIG. 10.

Control block 234 therefore indicates a special hysteresis downtime controller, which has the values $\Delta V_t$, $t_A$, $t_B$ and $\Delta Q_{WEC}^+$ as parameters. The timers have the meaning and effect that an activation of a step for the increase or decrease of reactive power is only conducted if timer1 achieves the value $t_A$. If the voltage returns to tolerance band 240 earlier, leaving the tolerance band has no impact on the control. However, if timer1 achieves the value $t_A$, the increase or decrease of the reactive power by one step is activated, and timer2 is started. It is then necessary to wait by all means until timer2 achieves the value $t_B$.

Said hysteresis controller, which is described in control block 234, aims at preventing, in combination with plant control unit 212, that the internal control of the wind power installation becomes instable if the voltage of the point of common coupling is used as an actual value. In addition, it is to be prevented that voltage controls which use the reactive power of the wind power installation or of the wind park as a manipulated variable become instable.

Control block 234, or Unit 1.3, realizes mathematical functions, which can also be used in places other than in the central control unit 208 (the central Unit 1), i.e., in the plant control unit 212 of individual wind power installations. Other input data, particularly measurement data, then lead to different findings, i.e., to different results.

Figure 13:
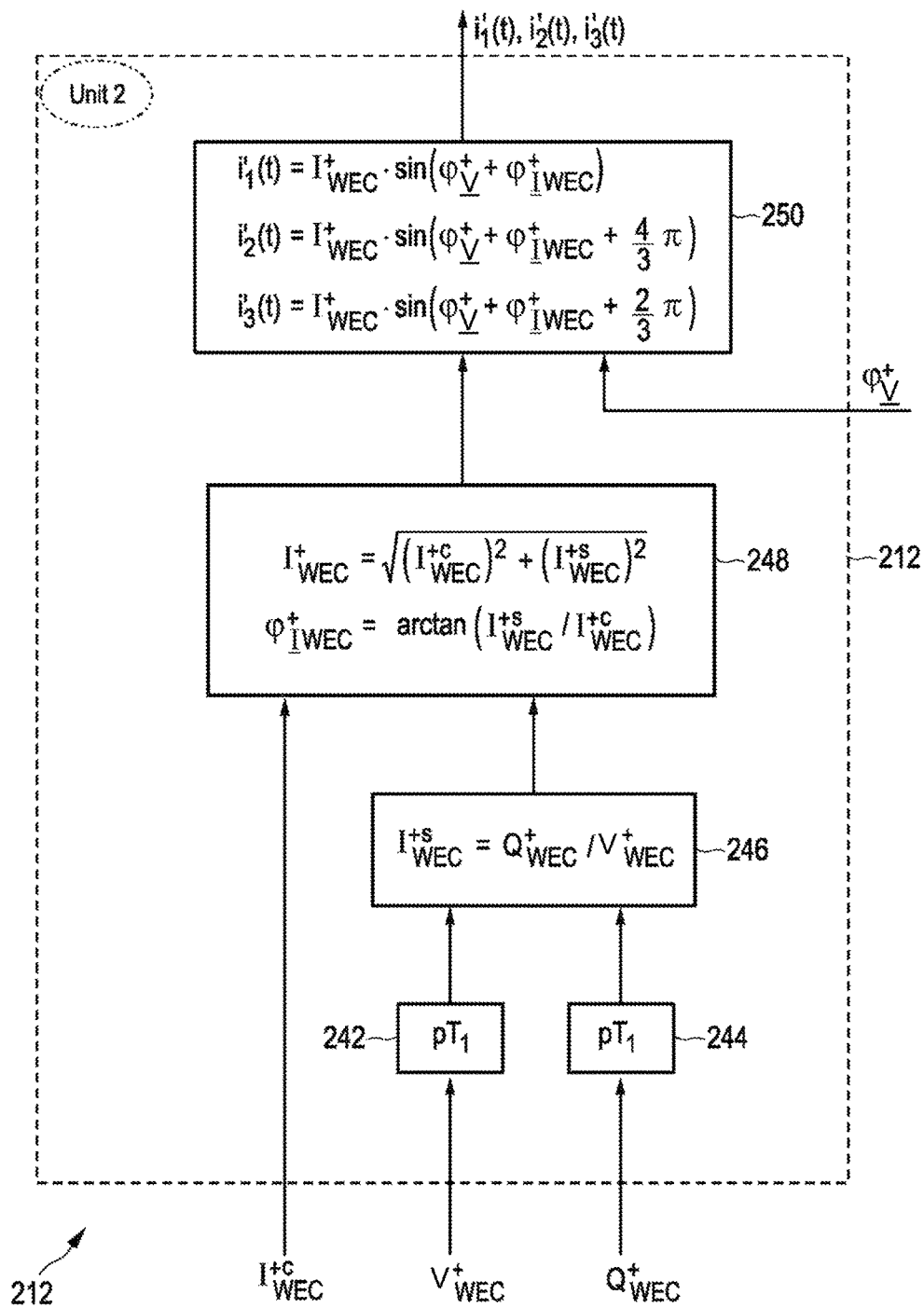
FIG. 13 shows a schematic view of a plant control unit that is also shown in FIG. 10

Plant control unit 212, several of which are provided in a wind park, particularly performs some calculations, as explained in FIG. 13. The cosine component of the positive sequence component current of the wind power installation $I_{WEC}^{+c}$ then enters said plant control unit 212. Furthermore, the voltage or virtual voltage of the positive sequence component of the wind power installation $V_{WEC}^{+}$ enters, and the reactive power (which is to be set) of the positive sequence component of the wind power installation $Q_{WEC}^{+}$. Said two values are conducted respectively via a delay element of the first order 242 or 244, and then led to sine component block 246. In sine component block 246, the sine component of the current that is to be set of the positive sequence component of the wind power installation $I_{WEC}^{+s}$ is calculated according to the formula shown there, i.e.:

$$I_{WEC}^{+s} = Q_{WEC}^{+}/V_{WEC}^{+}$$

On the basis of the cosine and sine component of the current that is to be set, the current amplitude of the current that is to be set of the positive sequence component $I_{WEC}^{+}$ and its angle $\varphi_{IWEC}^{+}$ is then calculated in total current block 248, as shown in block 248, i.e., by the formula:

$$I_{WEC}^{+} = \sqrt{(I_{WEC}^{+c})^2 + (I_{WEC}^{+s})^2}$$

$$\varphi_{IWEC}^{+} = \arctan(I_{WEC}^{+s}/I_{WEC}^{+c})$$

Finally, in the subsequent single current block 250, the 3 individual phase currents that are to be set $i_1'$, $i_2'$ and $i_3'$ are calculated by the equations shown there, and the result is output to plant control unit 212, and passed to PWM block 214 according to FIG. 10. Accordingly, the currents are calculated by the following equations:

$$i_1'(t) = I_{WEC}^{+} \cdot \sin(\varphi_V^{+} + \varphi_{IWEC}^{+})$$

$$i_2'(t) = I_{WEC}^{+} \cdot \sin\left(\varphi_V^{+} + \varphi_{IWEC}^{+} + \frac{4}{3}\pi\right)$$

$$i_3'(t) = I_{WEC}^{+} \cdot \sin\left(\varphi_V^{+} + \varphi_{IWEC}^{+} + \frac{2}{3}\pi\right)$$

Thus, the current components are determined by plant control unit 212 individually for each wind power installation 202, on the basis of values that were centrally predetermined by central control unit 208. In the example shown, the angle $\varphi_V^{+}$ depends on the specific measurement at the output of the specific wind power installation, and is thus individualized for the wind power installation.

Apart from that, the cosine share $I_{WEC}^{+c}$ results from the power control of the wind power installation. Delay elements of the first order 242 and 244 thus constitute filters. Said filters are parametrically adjusted to control block 234.

Therefore, the wind power installation control limits the power, and thus, if necessary, in more detail the current $I_{WEC}^{+c}$ to the value $P_{max\ WEC}^{+}$.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling a wind park comprising a central control unit and a plurality of wind power installations for feeding electrical power into an electrical AC grid at a point of common coupling, the method comprising:
   feeding a 3-phase current to the point of common coupling;
   identifying a grid voltage at the point of common coupling;
   comparing the grid voltage with at least one predetermined set point value;
   determining set point values for the wind power installations depending on the comparison to meet a stability criterion at the point of common coupling, wherein the stability criterion is variable, and the stability criterion depends on at least one of:
   a reactive power fed in by the wind park or an active power fed in by the wind park;
   calculating a stability boundary;
   storing the stability boundary in the central control unit as a characteristic map;
   determining set point values for the reactive power and the active power such that an operating point of the wind farm is located on a stable side of the stability boundary, wherein the operating point is defined by the active power fed in by the wind park and the reactive power fed in by the wind park, and the operating point is set or limited such that a safety distance between the operating point and the stability boundary is set and maintained;
   sending the determined set point values to plant control units of each of the wind power installations; and
   generating electrical current on each of the wind power installations depending on the determined set point values for joint feeding into the point of common coupling.

2. The method according to claim 1 further comprising:
   identifying and measuring the current fed into the point of common coupling;
   wherein at least one of the following are performed by the central control unit:

identifying the current fed in to the point of common coupling, identifying the grid voltage at the point of common coupling, comparing the grid voltage with the at least one predetermined set point value, and determining the set point value, wherein the stability criterion further depends on a grid condition of the AC grid at the point of common coupling.

3. The method according to claim 1 wherein determining the set point values comprises determining the set point values based on a breakdown into a positive sequence component and a negative sequence component according to a method of symmetrical components.

4. The method according to claim 1 wherein parameters at the point of common coupling are derived from measurements of at least one of voltage and current at the point of common coupling to assess characteristics of the AC grid.

5. The method according to claim 1, further comprising:
recording and storing grid sensitivities during a previously conducted grid analysis;
identifying current grid sensitivities for a current operating point, and at least one set point value; and
updating the at least one set point value depending on a comparison of the current grid sensitivity with the previously recorded grid sensitivities.

6. The method according to claim 2 wherein set point values for at least one of the reactive power and the active power changes, and wherein based on a response of the voltage of the grid at the point of common coupling, a current grid sensitivity is determined based on the change.

7. The method according to claim 1 wherein determining set point values comprises using an hysteresis controller to predetermine the set point values, and wherein at least one of the set point values is changed, when at least one electrical parameter in the grid meets a predetermined criterion.

8. The method according to claim 1 wherein determining set point values is based on the impedance of a supply line coupling one of the wind power installations of the plurality of wind power installations to the point of common coupling when a voltage drop on the supply line is expected.

9. The method according to claim 7, wherein the electrical parameter is a voltage at the point of common coupling, wherein the predetermined criterion is at least one of an upper threshold value, a lower threshold values, and outside of a tolerance band.

10. The method according to claim 5 further comprising reducing the set point value for the active power when the comparison of the comparison of the current grid sensitivity with the previously recorded grid sensitivities is above a high threshold value or below a low threshold value.

11. The method according to claim 3 wherein the set point values are values of the positive sequence component including at least one of:
at least one reactive power of the respective wind power installation and related to the positive sequence component, at least one output or clamp voltage of the respective wind power installation that is related to the positive sequence component, and at least one active power of the respective wind power installation and related to the positive sequence component.

12. A wind park, comprising:
a plurality of wind power installations for feeding electrical power into an electrical AC grid at a point of common coupling; and
a central control unit configured to control the wind park by:
causing a 3-phase current to be fed at the point of common coupling;
identifying a grid voltage at the point of common coupling;
comparing the grid voltage with at least one predetermined set point value;
determining set point values for the plurality of wind power installations depending on the comparison to meet a stability criterion at the point of common coupling, wherein the stability criterion is variable, and the stability criterion depends on at least one of: a reactive power fed in by the wind park or an active power fed in by the wind park;
calculating a stability boundary;
storing the stability boundary in the central control unit as a characteristic map;
determining set point values for the reactive power and the active power such that an operating point of the wind farm is located on a stable side of the stability boundary, wherein the operating point is defined by the active power fed in by the wind park and the reactive power fed in by the wind park, and the operating point is set or limited such that a safety distance between the operating point and the stability boundary is set and maintained;
sending the determined set point values to plant control units of each of the plurality of wind power installations; and
causing electrical current to be generated on each of the plurality of wind power installations depending on the determined set point values for joint feeding into the point of common coupling.

13. The wind park according to claim 12, wherein each wind power installation of the wind park comprises a plant control unit, wherein the central control unit is prepared to provide the plant control units with predetermined set point values for at least one of the reactive power and the active power.

14. The wind park according to claim 12, wherein at the point of common coupling has a short circuit current ratio that is less than 4.

15. The wind park according to claim 12, wherein a wind power installation of the plurality of wind power installations produces electrical power from wind, wherein the wind power installation is in the wind park, and includes a respective plant control unit to receive set point values from the central control unit of the wind park.

* * * * *